United States Patent
Gibson et al.

(10) Patent No.: US 12,002,108 B2
(45) Date of Patent: Jun. 4, 2024

(54) SYSTEMS AND METHODS FOR GENERATING A HOME SCORE AND MODIFICATIONS FOR A USER

(71) Applicant: STATE FARM MUTUAL AUTOMOBILE INSURANCE COMPANY, Bloomington, IL (US)

(72) Inventors: Sharon Gibson, Carlock, IL (US); Daniel Wilson, Glendale, AZ (US); Phillip Michael Wilkowski, Phoenix, AZ (US); Jason Goldfarb, Bloomington, IL (US); Arsh Singh, Frisco, TX (US); Dustin Helland, Morton, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

(21) Appl. No.: 17/973,108

(22) Filed: Oct. 25, 2022

(65) Prior Publication Data

US 2023/0342859 A1    Oct. 26, 2023

Related U.S. Application Data

(63) Continuation-in-part of application No. 17/816,391, filed on Jul. 29, 2022.

(60) Provisional application No. 63/410,101, filed on Sep. 26, 2022, provisional application No. 63/333,519, filed on Apr. 21, 2022, provisional application No. 63/332,972, filed on Apr. 20, 2022.

(51) Int. Cl.
G06Q 40/08    (2012.01)

(52) U.S. Cl.
CPC ..................... *G06Q 40/08* (2013.01)

(58) Field of Classification Search
CPC ....................................... G06Q 40/08
See application file for complete search history.

(56) References Cited

U.S. PATENT DOCUMENTS

| | | | |
|---|---|---|---|
| 9,057,746 | B1 | 6/2015 | Houlette et al. |
| 9,152,737 | B1 | 10/2015 | Micali et al. |
| 9,443,195 | B2 | 9/2016 | Micali et al. |
| 9,609,003 | B1 | 3/2017 | Chmielewski et al. |
| 9,699,529 | B1 | 7/2017 | Petri et al. |
| 9,739,813 | B2 | 8/2017 | Houlette et al. |

(Continued)

FOREIGN PATENT DOCUMENTS

| | | |
|---|---|---|
| CN | 111626536 A | 9/2020 |
| CN | 113138558 A | 7/2021 |

(Continued)

*Primary Examiner* — Edward Chang
(74) *Attorney, Agent, or Firm* — MARSHALL, GERSTEIN & BORUN LLP

(57) ABSTRACT

Systems and methods are described for evaluating and analyzing home data to generate a home score. The method may include: (1) retrieving home data for a first property; (2) determining, using a trained machine learning evaluation model, one or more home score factors based upon at least the home data; (3) generating, based upon the one or more home score factors, a home score for the first property; (4) retrieving past hazard data associated with a second property; and (5) generating based upon at least the past hazard data, a home modification recommendation.

20 Claims, 7 Drawing Sheets

(56) References Cited

U.S. PATENT DOCUMENTS

| | | |
|---|---|---|
| 9,798,979 B2 | 10/2017 | Fadell et al. |
| 9,800,958 B1 | 10/2017 | Petri et al. |
| 9,942,630 B1 | 4/2018 | Petri et al. |
| 10,102,584 B1 | 10/2018 | Devereaux et al. |
| 10,142,394 B2 | 11/2018 | Chmielewski et al. |
| 10,198,771 B1 | 2/2019 | Madigan et al. |
| 10,296,978 B1 | 5/2019 | Corder et al. |
| 10,311,302 B2 | 6/2019 | Kottenstette et al. |
| 10,332,059 B2 | 6/2019 | Matsuoka et al. |
| 10,366,288 B1 | 7/2019 | Kottenstette et al. |
| 10,387,966 B1 | 8/2019 | Shah et al. |
| 10,469,282 B1 | 11/2019 | Konrardy et al. |
| 10,586,177 B1 | 3/2020 | Choueiter et al. |
| 10,643,072 B2 | 5/2020 | Kottenstette et al. |
| 10,664,922 B1 | 5/2020 | Madigan et al. |
| 10,699,346 B1 | 6/2020 | Corder et al. |
| 10,699,348 B1 | 6/2020 | Devereaux et al. |
| 10,713,726 B1 | 7/2020 | Allen et al. |
| 10,735,829 B2 | 8/2020 | Petri et al. |
| 10,740,691 B2 | 8/2020 | Choueiter et al. |
| 10,750,252 B2 | 8/2020 | Petri et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,818,105 B1 | 10/2020 | Konrardy et al. |
| 10,907,844 B2 | 2/2021 | Ribbich et al. |
| 10,949,923 B1 | 3/2021 | Veith et al. |
| 11,003,334 B1 | 5/2021 | Conway et al. |
| 11,087,420 B1 | 8/2021 | Trundle |
| 11,100,594 B1 | 8/2021 | West et al. |
| 11,151,378 B2 | 10/2021 | Kottenstette et al. |
| 11,164,257 B1 | 11/2021 | Devereaux et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,277,465 B2 | 3/2022 | Chmielewski et al. |
| 11,348,193 B1 | 5/2022 | Konrardy et al. |
| 11,367,265 B2 | 6/2022 | Vianello et al. |
| 11,393,056 B1 | 7/2022 | Spickes et al. |
| 11,417,212 B1 | 8/2022 | Farooqui et al. |
| 2009/0265193 A1 | 10/2009 | Collins et al. |
| 2011/0213628 A1 | 9/2011 | Peak et al. |
| 2014/0266669 A1 | 9/2014 | Fadell et al. |
| 2015/0061859 A1 | 3/2015 | Matsuoka et al. |
| 2015/0154850 A1 | 6/2015 | Fadell et al. |
| 2015/0347910 A1 | 12/2015 | Fadell et al. |
| 2015/0356686 A1* | 12/2015 | Cook ............... G06Q 40/08 705/4 |
| 2016/0092959 A1 | 3/2016 | Gross |
| 2018/0365957 A1 | 12/2018 | Wright et al. |
| 2018/0375680 A1 | 12/2018 | Wright et al. |
| 2019/0251520 A1 | 8/2019 | Bentley, III et al. |
| 2019/0259112 A1 | 8/2019 | Siegman et al. |
| 2019/0304026 A1 | 10/2019 | Lyman et al. |
| 2020/0311825 A1 | 10/2020 | Shah et al. |
| 2021/0004910 A1 | 1/2021 | Trundle et al. |
| 2021/0151195 A1 | 5/2021 | Hayward |
| 2021/0279791 A1 | 9/2021 | Jacoby |
| 2021/0279811 A1 | 9/2021 | Waltman et al. |
| 2021/0295408 A1 | 9/2021 | Hayden et al. |
| 2021/0312789 A1 | 10/2021 | Linn |
| 2021/0374297 A1 | 12/2021 | McDade |
| 2022/0028567 A1 | 1/2022 | Aspro et al. |
| 2022/0051344 A1 | 2/2022 | Dhuvur et al. |
| 2022/0058556 A1 | 2/2022 | Warake et al. |
| 2022/0067851 A1 | 3/2022 | Sinha et al. |
| 2022/0101275 A1* | 3/2022 | Aspro ............... G16Y 10/80 |
| 2022/0138683 A1 | 5/2022 | Nimry et al. |
| 2022/0179376 A1 | 6/2022 | Fadell et al. |
| 2022/0270176 A1 | 8/2022 | Chintakindi et al. |
| 2022/0335366 A1 | 10/2022 | Sanchez |

FOREIGN PATENT DOCUMENTS

| | | |
|---|---|---|
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2021087185 A1 | 5/2021 |

* cited by examiner

SYSTEMS AND METHODS FOR GENERATING A HOME SCORE AND MODIFICATIONS FOR A USER

CROSS-REFERENCE TO RELATED APPLICATIONS

The present application is a continuation-in-part application of U.S. patent application Ser. No. 17/816,391, entitled "SYSTEMS AND METHODS FOR GENERATING A HOME SCORE AND MODIFICATIONS FOR A USER," filed Jul. 29, 2022, which claims priority to and the benefit of the filing date of provisional U.S. Patent Application No. 63/332,972 entitled "SYSTEMS AND METHODS FOR GENERATING A HOME SCORE AND MODIFICATIONS FOR A USER," filed on Apr. 20, 2022 and provisional U.S. Patent Application No. 63/333,519 entitled "SYSTEMS AND METHODS FOR GENERATING A HOME SCORE AND MODIFICATIONS FOR A USER," filed on Apr. 21, 2022. The present application also claims priority to and the benefit of the filing date of provisional U.S. Patent Application No. 63/410,101, filed on Sep. 26, 2022. The entire contents of each of the preceding applications are hereby expressly incorporated herein by reference.

FIELD OF THE DISCLOSURE

Systems and methods are disclosed for evaluating and generating a modified home score, and providing recommendations for a property using home data.

BACKGROUND

When moving to a new home, a user may not be aware of important information regarding the property, the surrounding area, and/or availability of important public services. This may be particularly true for when a user is moving between states, countries, or areas with differences between environments. Moreover, current methods of providing information to potential homeowners and/or individuals moving between such locations may be inefficient or may not provide such important details.

Further, when performing maintenance or updates to a home, a user may not be aware of how important various maintenance tasks and/or updates may be to the well-being and integrity of the home. Moreover, conventional methods of providing such information to homeowners are often inefficient, and generally lack security and privacy. Similarly, conventional methods for providing such information may lack important details that a homeowner would use to make an informed decision. Conventional techniques may have other drawbacks as well.

SUMMARY

The present embodiments may relate to, inter alia, a computer-implemented method for efficiently evaluating and generating a metric for a property that is representative of (i) important features associated with a property, and/or (ii) important differences between a past or present property and a new property to which a user is moving. The present embodiments may also relate to a computer-implemented method for efficiently, securely, and privately evaluating and modifying a metric for a property that is representative of modifications and/or updates to the property or features associated with the property.

In one aspect, a computer-implemented method for evaluating and gamifying maintenance for a property by a user may be provided. The method may be implemented via one or more local or remote processors, servers, sensors, transceivers, memory units, and/or other electronic or electrical components. The method may include: (1) retrieving, by one or more processors, home data for a first property; (2) determining, by the one or more processors and using a trained machine learning evaluation model, one or more home score factors based upon at least the home data; (3) generating, by the one or more processors and based upon the one or more home score factors, a home score for the first property; (4) retrieving, by the one or more processors, past hazard data associated with a second property; and/or (5) generating, by the one or more processors and based upon at least the past hazard data, a home modification recommendation. The method may include additional, less, or alternative actions, including those discussed elsewhere herein.

For instance, in some embodiments, each of the home score factors has an equal weight. In further embodiments, the one or more home score factors are one or more first home score factors and generating the home modification recommendation includes: determining one or more second home score factors based on at least the past hazard data; comparing the one or more second home score factors with the one or more first home score factors to determine a particular second home score factor is greater than a corresponding first home score factor; and/or generating the home modification recommendation such that the home modification recommendation corresponds to the particular second home score factor.

In some embodiments, the home score is a first home score, and generating the home modification recommendation includes: determining, based upon at least the past hazard data, a home modification implemented for the second property that caused an improvement to a second home score corresponding to the second property; and/or generating the home modification recommendation such that the home modification recommendation includes the determined home modification. In further embodiments, modifying the home score is further based at least upon the improvement to the second home score.

In certain embodiments, the home score factors include: (i) a fire hazard score, (ii) a safety score, (iii) a weather hazard score, (iv) a property feature hazard score, and/or (v) a potential hazards score.

In some embodiments, the method further comprises receiving an indication that the user implemented a modification in accordance with the home modification recommendation; and/or modifying, based upon at least the past hazard data, the home score to create a modified home score in response to receiving the indication.

In another aspect, a computing device for evaluating and gamifying maintenance for a property by a user may be provided. The computing device may include: one or more processors; a communication unit; and a non-transitory computer-readable medium coupled to the one or more processors and the communication unit and storing instructions thereon that, when executed by the one or more processors, cause the computing device to: (1) retrieve home data for a first property; (2) determine, using a trained machine learning evaluation model, one or more home score factors based upon at least the home data; (3) generate, based upon the one or more home score factors, a home score for the first property; (4) retrieve past hazard data associated with a second property; and/or (5) generate, based upon at least the past hazard data, a home modification recommendation. The computing device may include additional, less, or alternate functionality, including that discussed elsewhere herein.

For instance, in some embodiments, each of the home score factors has an equal weight. In further embodiments, the one or more home score factors are one or more first home score factors and generating the home modification recommendation includes: determining one or more second home score factors based on at least the past hazard data; comparing the one or more second home score factors with the one or more first home score factors to determine a particular second home score factor is greater than a corresponding first home score factor; and/or generating the home modification recommendation such that the home modification recommendation corresponds to the particular second home score factor.

In some embodiments, the home score is a first home score, and generating the home modification recommendation includes: determining, based upon at least the past hazard data, a home modification implemented for the second property that caused an improvement to a second home score corresponding to the second property; and/or generating the home modification recommendation such that the home modification recommendation includes the determined home modification. In further embodiments, modifying the home score is further based at least upon the improvement to the second home score.

In certain embodiments, the home score factors include: (i) a fire hazard score, (ii) a safety score, (iii) a weather hazard score, (iv) a property feature hazard score, and/or (v) a potential hazards score.

In some embodiments, the non-transitory computer-readable medium further stores instructions that, when executed by the one or more processors, cause the computing device to receive an indication that the user implemented a modification in accordance with the home modification recommendation; and/or modify, based upon at least the past hazard data, the home score to create a modified home score in response to receiving the indication.

In another aspect, a tangible, non-transitory computer-readable medium storing instructions for evaluating and gamifying maintenance for a property by a user may be provided. The non-transitory computer-readable medium stores instructions that, when executed by one or more processors of a computing device, cause the computing device to: (1) retrieve home data for a first property; (2) determine, using a trained machine learning evaluation model, one or more home score factors based upon at least the home data; (3) generate, based upon the one or more home score factors, a home score for the first property; (4) retrieve past hazard data associated with a second property; and/or (5) generate, based upon at least the past hazard data, a home modification recommendation. The computer-readable instructions may include instructions that provide additional, less, or alternate functionality, including that discussed elsewhere herein.

For instance, in some embodiments, each of the home score factors has an equal weight. In further embodiments, the one or more home score factors are one or more first home score factors and generating the home modification recommendation includes: determining one or more second home score factors based on at least the past hazard data; comparing the one or more second home score factors with the one or more first home score factors to determine a particular second home score factor is greater than a corresponding first home score factor; and/or generating the home modification recommendation such that the home modification recommendation corresponds to the particular second home score factor.

In some embodiments, the home score is a first home score, and generating the home modification recommendation includes: determining, based upon at least the past hazard data, a home modification implemented for the second property that caused an improvement to a second home score corresponding to the second property; and/or generating the home modification recommendation such that the home modification recommendation includes the determined home modification. In further embodiments, modifying the home score is further based at least upon the improvement to the second home score.

In certain embodiments, the home score factors include: (i) a fire hazard score, (ii) a safety score, (iii) a weather hazard score, (iv) a property feature hazard score, and/or (v) a potential hazards score.

In some embodiments, the non-transitory computer-readable medium further stores instructions that, when executed by the one or more processors, cause the computing device to receive an indication that the user implemented a modification in accordance with the home modification recommendation; and modify, based upon at least the past hazard data, the home score to create a modified home score in response to receiving the indication.

In another aspect, a computer-implemented method for evaluating and gamifying maintenance for a property by a user may be provided. The method may be implemented via one or more local or remote processors, servers, sensors, transceivers, memory units, and/or other electronic or electrical components. The method may include: (1) retrieving home and hazard data for a property; (2) determining, using a suite of trained machine learning evaluation models, one or more home score factors based upon at least the home and hazard data; (3) generating, based upon the one or more home score factors, a home score for the property and home modification recommendation(s). The method may include additional, less, or alternative actions, including those discussed elsewhere herein.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
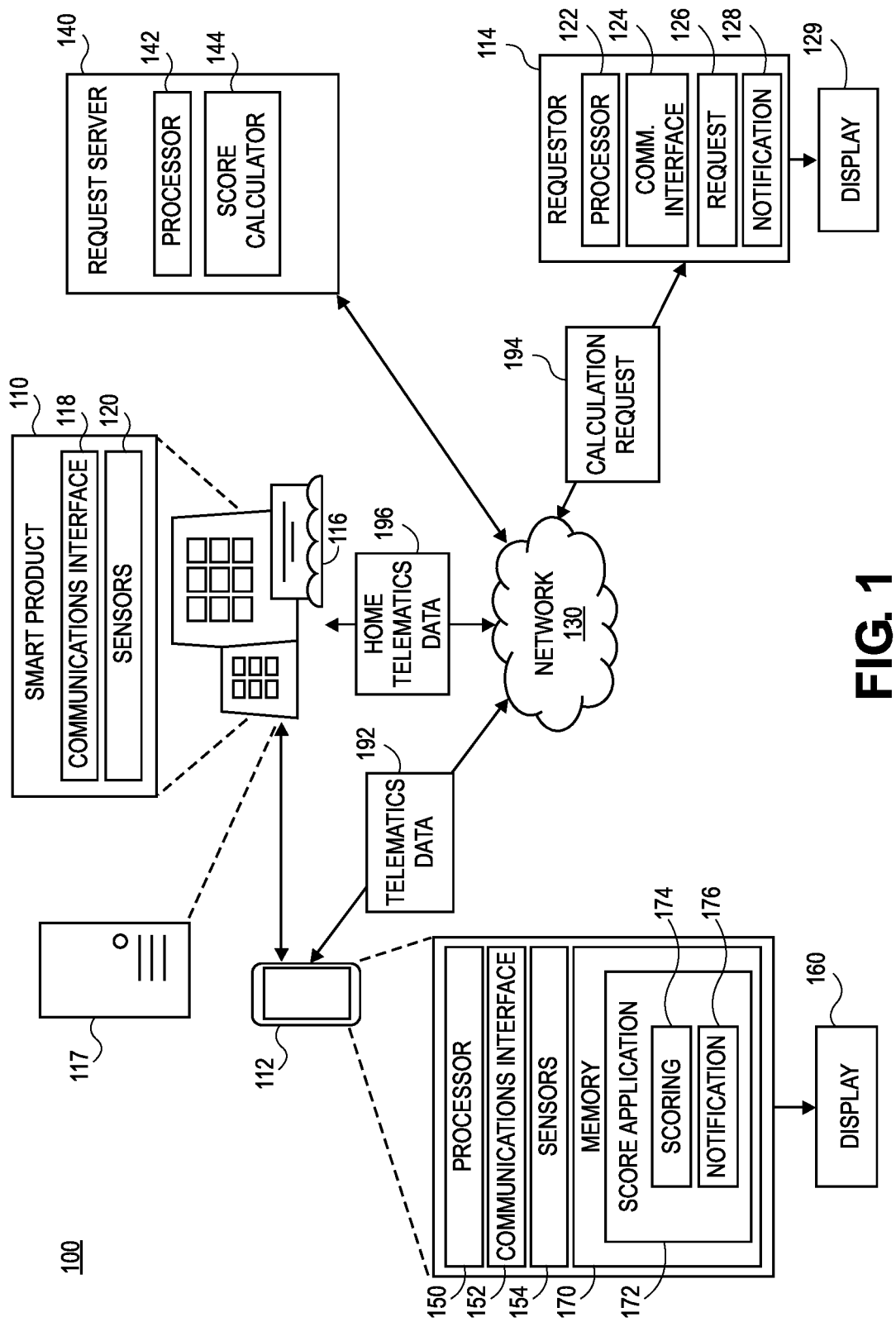
FIG. 1 depicts an exemplary computing system that facilitates retrieving home data from a property, smart device, and/or mobile device, as well as evaluating and generating a home score from home data collected by the system and/or stored on a server.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for evaluating and generating a home score and modifications for a property. For example, a system may use a machine learning model to evaluate data related to the property and/or user, and identify data related to characteristics of the property and/or a likelihood of loss associated with the property. The model may then use the characteristic data and/or likelihood of loss to determine relevant factors to the property and subsequently calculate a home score. In some scenarios, the system may further generate recommended modifications to perform based upon the home score and/or user data. In further scenarios, a device may display the calculated home score and/or modification recommendations to a user moving to a new home and/or looking to perform maintenance on a home. In some such embodiments, the device may further display relevant factors and/or characteristics of the property in addition to the calculated home score and/or recommendations.

When moving to a new property and/or performing maintenance on a property, homeowners and/or property owners may benefit from additional information to facilitate decisions and/or actions. However, such homeowners and/or property owners may be unable to readily access some of the potentially useful information that would influence such a decision. While the data exists, much of said data is either difficult for an individual to gather, generally held private, and/or the use of the data is not apparent.

By training and/or using a machine learning model trained on home and/or property data to evaluate such data, a system can collect and analyze large quantities of data to determine what data is relevant to a potential decision. Moreover, by training and/or using a machine learning data evaluation model, the system can identify otherwise invisible trends and relations between characteristics and potentially impactful factors, such as the risk inherent in particular building materials and/or designs. As such, the system may generate a home score, modifications to a home score, and/or recommended actions based upon the characteristics of a property, the likelihood of loss and/or risk, as well as the various identified trends and relationships with home factors.

More specifically, the system may generate the home score and/or recommended actions based upon factors such as environmental data, location data, first responder data, home structure data, occupancy data, usage data, user data, and/or likelihood of loss data. In some embodiments, the system retrieves and analyzes home data and/or user data using a machine learning model to determine and/or weight the relevant factors. In further embodiments, the system scores the factors in determining an overall home score for the property in question.

In some embodiments, the system may display and/or cause a computing device to display the home score to a user. In further embodiments, the system may similarly display and/or cause a computing device to display home score factors and/or characteristic data to a user in addition to the home score and/or recommended actions. Depending on the embodiment, the system may calculate the home score depending on different factors. For example, the system may calculate a home score to show to a user potential or planned maintenance on a house differently than the system may calculate a home score for a user moving to the house. Similarly, the system may display and/or cause a computing device to display the different home scores, recommended actions, home score factors, and/or home characteristic data depending on the application. In further embodiments, the system may display and/or cause a computing device to display the home score and/or recommended actions to the user in response to receiving an indication and/or request from the user.

The present embodiments relate to computing systems and computer-implemented methods for evaluating and generating a home score for a property. The property may be a house, an office building, an apartment, a condominium, a home extension, a garage, a deck, an empty plot, or any other such property which a user would potentially purchase, build, and/or otherwise develop.

Exemplary System for Calculating a Home Score and Modifications

FIG. 1 depicts an exemplary system 100 for calculating a home score for a property. Depending on the embodiment, the system 100 may calculate a home score, a moving home score, a maintenance home score, or any other similar home score for a user. In further embodiments, the system 100 may determine recommended actions to modify or improve the home score as well. An entity (e.g., requestor 114), such as a user or an insurance company, may wish to calculate and/or view any such home score or recommended action for a real property (e.g., property 116).

Additionally, the property (e.g., property 116) and, more specifically, a computing device 117 associated with the property 116, a smart device 110 within the property 116, and/or one or more mobile devices may detect, gather, or store home data (e.g., home telematics data) associated with the functioning, operation, and/or evaluation of the property 116. The computing device 117 associated with the property 116 may transmit home telematics data in a communication 196 via the network 130 to a request server 140.

In some embodiments, the request server 140 may already store home data (e.g., home telematics data) and/or user data (e.g., user telematics data) in addition to any received home telematics data or user telematics data. Further, the request server 140 may use the home telematics data and/or user telematics data to evaluate and calculate a home score for the property 116. Additionally or alternatively, one or more mobile devices (e.g., mobile device 112) communicatively coupled to the computing device associated with the property 116 may transmit home telematics data and/or user telematics data in communication 192 to the request server 140 via the network 130.

The smart device 110 may include a processor, a set of one or several sensors 120, and/or a communications interface 118. In some embodiments, the smart device 110 may include single devices, such as a smart television, smart refrigerator, smart doorbell, or any other similar smart device. In further embodiments, the smart device 110 may include a network of devices, such as a security system, a lighting system, or any other similar series of devices communicating with one another. The set of sensors 120 may include, for example, a camera or series of cameras, a motion detector, a temperature sensor, an airflow sensor, a smoke detector, a carbon monoxide detector, or any similar sensor.

Although FIG. 1 depicts the set of sensors 120 inside the smart device 110, it is noted that the sensors 120 need not be internal components of the smart device 110. Rather, a property 116 may include any number of sensors in various locations, and the smart device 110 may receive data from these sensors during operation. In further embodiments, the computing device 117 associated with the property 116 may receive data from the sensors during operation. In still further embodiments, the computing device 117 associated with the property 116 may be the smart device 110.

The communications interface 118 may allow the smart device 110 to communicate with the mobile device 112, the sensors 120, and/or a computing device 117 associated with the property 116. The communications interface 118 may support wired or wireless communications, such as USB, Bluetooth, Wi-Fi Direct, Near Field Communication (NFC), etc. The communications interface 118 may allow the smart device 110 to communicate with various content providers, servers, etc., via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc. The processor may operate to format messages transmitted between the smart device 110 and the mobile device 112, sensors 120, and/or computing device 117 associated with the property 116; process data from the sensors 120; transmit communications to the request server 140; etc.

In some embodiments, the smart device 110 may collect the home telematics data using the sensors 120. Depending on the embodiment, the smart device may collect home telematics data regarding the usage and/or occupancy of the property. In some embodiments, the home telematics data may include data such as security camera data, electrical system data, plumbing data, appliance data, energy data, maintenance data, guest data, homeshare data, home layout data (e.g., home structure, number of bedrooms, number of bathrooms, square footage, etc.), home characteristic data, and any other suitable data representative of property 116 occupancy and/or usage.

For instance, the home telematics data may include data gathered from motion sensors and/or images of the home from which it may be determined how many people occupy the property and the amount of time they each spend within the home. Additionally or alternatively, the home telematics data may include electricity usage data, water usage data, HVAC usage data (e.g., how often the furnace or air conditioner unit is on), and smart appliance data (e.g., how often the stove, oven, dish washer, or clothes washer is operated). The home telematics data may also include home occupant mobile device data or home guest mobile device data, such as GPS or other location data.

The user data (e.g., user telematics data) may include data from the user's mobile device, or other computing devices, such as smart glasses, wearables, smart watches, laptops, etc. The user data or user telematics data may include data associated with the movement of the user, such as GPS or other location data, and/or other sensor data, including camera data or images acquired via the mobile or other computing device. In some embodiments, the user data and/or user telematics data may include historical data related to the user, such as historical home data, historical claim data, historical accident data, etc. In further embodiments, the user data and/or user telematics data may include present and/or future data, such as expected home data when moving, projected claim data, projected accident data, etc. Depending on the embodiment, the historical user data and the present and/or future data may be related.

The user data or user telematics data may also include vehicle telematics data collected or otherwise generated by a vehicle telematics app installed and/or running on the user's mobile device or other computing device. For instance, the vehicle telematics data may include acceleration, braking, cornering, speed, and location data, and/or other data indicative of the user's driving behavior.

The user data or user telematics data may also include home telematics data collected or otherwise generated by a home telematics app installed and/or running on the user's mobile device or other computing device. For instance, a home telematics app may be in communication with a smart home controller and/or smart appliances or other smart devices situated about a home, and may collect data from the interconnected smart devices and/or smart home sensors. Depending on the embodiment, the user telematics data and/or the home telematics data may include information input by the user at a computing device or at another device associated with the user. In further embodiments, the user telematics data and/or the home telematics data may only be collected or otherwise generated after receiving a confirmation from the user, although the user may not directly input the data.

Mobile device 112 may be associated with (e.g., in the possession of, configured to provide secure access to, etc.) a particular user, who may be an owner of a property, such as property 116. In further embodiments, the mobile device 112 may be associated with a potential homeowner, shopper, developer, or other such particular user. Mobile device 112 may be a personal computing device of that user, such as a smartphone, a tablet, smart glasses, smart headset (e.g., augmented realty, virtual reality, or extended reality headset or glasses), wearable, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160.

Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid state memory) and may store one or more applications, including report application 172.

The mobile device 112 may be communicatively coupled to the smart device 110, the sensors 120, and/or a computing device 117 associated with the property 116. For example, the mobile device 112 and the smart device 110, sensors 120, and/or computing device 117 associated with the property 116 may communicate via USB, Bluetooth, Wi-Fi Direct, Near Field Communication (NFC), etc. For example, the smart device 110 may send home telematics data, user telematics data, or other sensor data in the property 116 via communications interface 118 and the mobile device 112 may receive the home telematics data or other sensor data via communications interface 152. In other embodiments, mobile device 112 may obtain the home telematics data from the property 116 from sensors 154 within the mobile device 112.

Further still, mobile device 112 may obtain the home telematics data and/or user telematics data via a user interaction with a display 160 of the mobile device 112. For example, a user may take a photograph indicative of a property and/or input information regarding a characteristics indicative of potential hazards or other such home score factors associated with the property 116 at the display 160. Scoring unit 174 may be configured to prompt a user to take a photograph or input information at the display 160. The mobile device 112 may then generate a communication that may include the home telematics data and/or user telematics data and may transmit the communication 192 to the request server 140 via communications interface 152.

In some embodiments, the scoring application 172 may include or may be communicatively coupled to a home score application or website. In such embodiments, the request server 140 may obtain the home telematics data and/or user telematics data via stored data in the home score application or via a notification 176 in the scoring application 172 granting the scoring application 172 access to the home score application data.

Depending on the embodiment, a computing device 117 associated with the property 116 may obtain home telematics data for the property 116 indicative of environmental conditions, housing and/or construction conditions, location conditions, first responder conditions, or other similar metrics of home telematics data. The computing device 117 associated with the property 116 may obtain the home telematics data from one or more sensors 120 within the property 116. In other embodiments, the computing device 117 associated with the property 116 may obtain home telematics data through interfacing with a mobile device 112.

Depending on the embodiment, home telematics data may be indicative of both visible and invisible hazards to the property. For example, the home telematics data may include image data of the property 116 as well as internal diagnostic data on functionality of particular devices or components of the property 116. In another example, home telematics data may be used to determine that the property 116 and/or components of the property 116 are likely to require repair and/or replacement, and may lead to a potential risk or claim associated with the property 116.

In some embodiments, the home telematics data may include interpretations of raw sensor data, such as detecting an intruder event when a sensor detects motion during a particular time period. The computing device 117 associated with the property 116, mobile device 112, and/or smart device 110 may collect and transmit home telematics data to the request server 140 via the network 130 in real-time or at least near real-time at each time interval in which the system 100 collects home telematics data. In other embodiments, a component of the system 100 may collect a set of home telematics data at several time intervals over a time period (e.g., a day), and the smart device 110, computing device 117 associated with the property 116, and/or mobile device 112 may generate and transmit a communication which may include the set of home telematics data collected over the time period.

Also, in some embodiments, the smart device 110, computing device 117 associated with the property 116, and/or mobile device 112 may generate and transmit communications periodically (e.g., every minute, every hour, every day), where each communication may include a different set of home telematics data and/or user telematics data collected over the most recent time period. In other embodiments, the smart device 110, computing device 117 associated with the property 116, and/or mobile device 112 may generate and transmit communications as the smart device 110, mobile device 112, and/or computing device 117 associated with the property 116 receive new home telematics data and/or user telematics data.

In further embodiments, a trusted party may collect and transmit the home telematics data and/or user telematics data, such as an evidence oracle. The evidence oracles may be devices connected to the internet that record and/or receive information about the physical environment around them, such as a smart device 110, a mobile device 112, sensors 120, a request server 140, etc. In further examples, the evidence oracles may be devices connected to sensors such as connected video cameras, motion sensors, environmental conditions sensors (e.g., measuring atmospheric pressure, humidity, etc.) as well as other Internet of Things (IoT) devices.

The data may be packaged into a communication, such as communication 192 or 196. The data from the evidence oracle may include a communication ID, an originator (identified by a cryptographic proof-of-identity, and/or a unique oracle ID), an evidence type, such as video and audio evidence, and a cryptographic hash of the evidence. In another embodiment, the evidence is not stored as a cryptographic hash, but may be directly accessible by an observer or other network participant.

Next, the smart device 110 and/or computing device 117 associated with the property 116 may generate a communication 196 including a representation of the home telematics data wherein the communication 196 is stored at the request server 140 and/or an external database (not shown).

In some embodiments, generating the communication 196 may include obtaining identity data for the smart device 110, computing device 117, and/or the property 116; obtaining identity data for the mobile device 112 in the property 116; and/or augmenting the communication 196 with the identity data for the smart device 110, the property 116, the computing device 117, and/or the mobile device 112. The communication 196 may include the home telematics data or a cryptographic hash value corresponding to the home telematics data.

In some embodiments, the mobile device 112 or the smart device 110 may transmit the home telematics data and/or user telematics data to a request server 140. The request server 140 may include a processor 142 and a memory that stores various applications for execution by the processor 142. For example, a score calculator 144 may obtain home telematics data for a property 116 and/or user telematics data for a user to analyze, calculate, and/or determine a risk, home score factor, recommended action, or home score for a property 116 during a particular time period in response to a calculation request 194, as described in more detail below with regard to FIG. 6.

In further embodiments, a requestor 114 may transmit a communication 194 including a score calculation request to the request server 140 via the network 130. Depending on the embodiment, the requestor may include one or more processors 122, a communications interface 124, a request module 126, a notification module 128, and a display 129. In some embodiments, each of the one or more processors 122, communications interface 124, request module 126, notification module 128, and display 129 may be similar to the components described above with regard to the mobile device 112.

Depending on the embodiment, the requestor 114 may be associated with a particular user, such as a shopper, a home shopping website and/or application, a home rental website and/or application, a construction company, a real estate company, an underwriting company, an insurance company, etc. In some embodiments, the requestor 114 may be associated with the same user as the request server 140. In other embodiments, the requestor 114 is associated with a different user than the request server 140. In some such embodiments, the request module 126 and/or notification module 128 may include or be part of a request application, such as an underwriting application, a shopping application, an insurance application, etc.

In some embodiments, the requestor 114 may transmit a communication 194 including a score request to the requestor 140 via the communications interface 124. In some such embodiments, the requestor 114 may request the score to use as an input to a rating model, an underwriting model, a claims generation model, or any other similarly suitable model. For example, the requestor 114 may request the score to use to determine a potential risk for a property. As another example, the requestor 114 may request multiple scores to determine potential hazards with regard to building types.

Exemplary Home Score Factors

In some embodiments, the home score calculation may include a calculation for home score factors, such as (i) an environment score; (ii) a location score; (iii) a first responder score; (iv) a construction score; (v) a usage score; (vi) an occupancy score, and/or (v) a risk score. Depending on the embodiment, the environment score may be representative of environmental hazards and/or benefits. For example, the environment score may be representative of weather, temperature, seasonal hazards and/or changes, local fauna, local flora, air quality, pollen, landscape, bodies of water, and any other such suitable environmental hazards and/or benefits.

The location score may be representative of location-based hazards and/or benefits. For example, the location score may be representative of local population density, local classification (e.g., urban, rural, suburban, city, town, village, etc.), proximity to a highway, proximity to public transportation, proximity to various businesses, proximity to neighbors, proximity to schools, crime rates, and any other such suitable location-based hazards and/or benefits.

The first responder score may be representative of accessibility to first responders in emergency events. For example, the first responder score may be representative of proximity to a hospital, proximity to a fire station, proximity to a police station, presence of nearby fire hydrants, ease of ambulance access, crime response rate, crime response time and/or speed, and any other such suitable hazards and/or benefits.

The construction score may be representative of hazards and/or benefits related to the construction of a house or other item on the property. For example, the construction score may be representative of adherence to construction codes, adherence to construction best practices, building materials used, structural stability, architectural design, house age, history of replacements and/or repairs, appliances, smart devices, plumbing, water consumption, power consumption, wiring, security, and any other such suitable hazards and/or benefits.

Similarly, the usage score may be representative of hazards and benefits related to the usage of the property, and the occupancy score may be representative of hazards and benefits related to the occupancy of the property.

In some embodiments, the risk score may be representative of a level of risk related to the property. The level of risk calculation may include a determination as to past or potential claim damage and/or severity of claim damage. In some embodiments, the level of risk may refer to a level of risk for a particular time period.

Additionally or alternatively, the level of risk may include a determination of a quote or cost associated with the level of risk for the particular time period. In still further embodiments, the level of risk may include a determination of a quote or cost associated with the level of risk for a longer period of time, such as a month, year, etc. In further embodiments, the level of risk may depend on additional factors, such as type of claim, cost of claim, cause of the claim, confirmation of fault, liability amount paid out, property damage paid out, freeform data (need to understand that from a data perspective, so needs other processing), whether coverage is paid, catastrophe, bodily injury, repair costs, estimated values for items damaged, prior damage, claim subrogation status, location of loss, date of loss, time of loss, date the claim was reported, etc.

It will be understood that, in some embodiments, some home telematics data and/or user telematics data may influence multiple home score factors as described above. In some such embodiments, the system 100 may only apply the home telematics data and/or user telematics data to the factor most influenced by the data in question. In other embodiments, the system 100 applies the home telematics data and/or user telematics data to all potential categories. In still other embodiments, the system 100 applies the home telematics data and/or user telematics data to a first factor and then, based upon the application to the first factor, determines not to apply the home telematics data and/or user telematics data to any other factors.

Moreover, the home score provides a benefit through increased security and privacy, as the score reduces risk of reverse engineering private details. Notably, by calculating the home score, the system 100 allows for public disclosure of important and/or useful data without risk of individual characteristics or factors becoming known. For example, a home score of 78 out of 100 for a property would allow a useful metric to a potential buyer or group using the home score for underwriting, but would not provide access to the information underlying the score. For example, an owner of a property may prefer to keep details regarding insurance claims private, but may still need to assure a potential buyer regarding the home.

In some embodiments, the home score depends on at least one of type of claim, cost of claim, cause of the claim, confirmation of fault, liability amount paid out, property damage paid out, freeform data (need to understand that from a data perspective, so needs other processing), whether coverage is paid, catastrophe, bodily injury, repair costs, estimated values for items damaged, prior damage, claim subrogation status, location of loss, date of loss, time of loss, date the claim was reported, etc. None of the information used to generate the home score is visible, however, allowing for greater privacy and security. As such, the system 100 may anonymize the home score such that anonymized underwriting can be performed using the anonymized home score in that the underlying information is kept unknown to the underwriter.

In some embodiments, a mobile device 112 may stream the home telematics data and/or user telematics data to the request server 140 via the network 130 in real or near-real time. For example, the mobile device and/or a scoring application 172 on the mobile device 112 may update the request server 140 via the network 130 whenever a new event occurs with regard to home telematics data and/or user telematics data. In further embodiments, the mobile device 112 may receive confirmations of updated information and may notify the user that the mobile device 112 has updated the request server 140 via the network 130.

Exemplary Machine Learning

Optionally, the system 100 may determine home characteristic data and/or a level of risk from the home telematics data and/or user telematics data using a machine learning model for data evaluation. The machine learning model may be trained based upon a plurality of sets of home telematics data and/or user telematics data and corresponding home characteristic data and/or levels of risk. The machine learning model may use the home telematics data and/or user telematics data to generate the home characteristic data and/or level of risk. In some embodiments, the machine learning model may use the home characteristic data and/or level of risk to generate the home score factors and/or the home score. In still further embodiments, the machine learning model may use the home score factors to generate the home score.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

In some embodiments, the methods and systems described herein may use machine learning techniques to identify and estimate the effects of observed or latent variables such as weather, temperature, seasonal hazards and/or changes, local fauna, local flora, air quality, pollen, landscape, bodies of water, local population density, local classification (e.g., urban, rural, suburban, city, town, village, etc.), proximity to a highway, proximity to public transportation, proximity to various businesses, proximity to neighbors, proximity to schools, crime rates, proximity to a hospital, proximity to a fire station, proximity to a police station, presence of nearby fire hydrants, ease of ambulance access, crime response rate, crime response time and/or speed, adherence to construction codes, adherence to construction best practices, building materials used, structural stability, architectural design, house age, history of replacements and/or repairs, appliances, smart devices, plumbing, water consumption, power consumption, wiring, security, type of claim, cost of claim, cause of the claim, confirmation of fault, liability amount paid out, property damage paid out, freeform data (need to understand that from a data perspective, so needs other processing), coverage is paid, catastrophe, bodily injury, repair costs, estimated values for items damaged, prior damage, claim subrogation status, location of loss, date of loss, time of loss, date the claim was reported, etc.

Some embodiments described herein may include automated machine learning to determine risk levels, identify relevant risk factors, evaluate home telematics data and/or user telematics data, identify environmental risk factors, identify locale-based risk factors, identify home structure risk factors, identify first responder-based risk factors, identify occupancy risk factors, identify usage risk factors, calculate an environmental score, calculate a location score, calculate a home structure score, calculate a first responder score, calculate an occupancy score, calculate a usage score, calculate an overall home score, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as customer financial transaction, location, browsing or online activity, mobile device, vehicle, and/or home sensor data) in order to facilitate making predictions for subsequent customer data. Models may be created based upon example inputs of data in order to make valid and reliable predictions for novel inputs.

Additionally or alternatively, the machine learning programs may be trained by inputting sample data sets or certain data into the programs, such as mobile device, server, or home system sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with smart device-mounted, home-mounted, and/or mobile device-mounted sensor data to identify certain home data, such as analyzing home telematics data and/or user telematics data to identify and/or determine environmental data, location data, first responder data, home structure data, occupancy data, usage data, an overall home score, and/or other such potentially relevant data.

After training, machine learning programs (or information generated by such machine learning programs) may be used to evaluate additional data. Such data may be related to publically accessible data, such as building permits, tax assessor data, and/or chain of title. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

The mobile device 112 and the computing device 117 associated with the property 116 may be associated with the same user. Mobile device 112, and optionally the computing device 117 associated with the property 116, may be communicatively coupled to requestor 114 via a network 130. Network 130 may be a single communication network, or may include multiple communication networks of one or more types (e.g., one or more wired and/or wireless local area networks (LANs), and/or one or more wired and/or wireless wide area networks (WANs) such as the internet). In some embodiments, the requestor 114 may connect to the network 130 via a communications interface 124 much like mobile device 112.

While FIG. 1 shows only one mobile device 112, it is understood that many different mobile devices (of different users), each similar to mobile device 112, may be in remote communication with network 130. Additionally, while FIG. 1 shows only one property 116 and associated computing device 117, it is understood that many different entity locations, each similar to property 116, may include computing devices 117 that are in remote communication with network 130.

Further, while FIG. 1 shows only one requestor, 114, it is understood that many different requestors, each similar to requestor 114, may be in remote communication with network 130. Requestor 114 and/or any other similar requestor may be associated with an insurance company, a regulator organization, a property rental company, and/or a similar organization.

It will be understood that the above disclosure is one example and does not necessarily describe every possible embodiment. As such, it will be further understood that alternate embodiments may include fewer, alternate, and/or additional steps or elements.

Exemplary Architecture for a Computing Device Transmitting Data to be Analyzed

Figure 2:
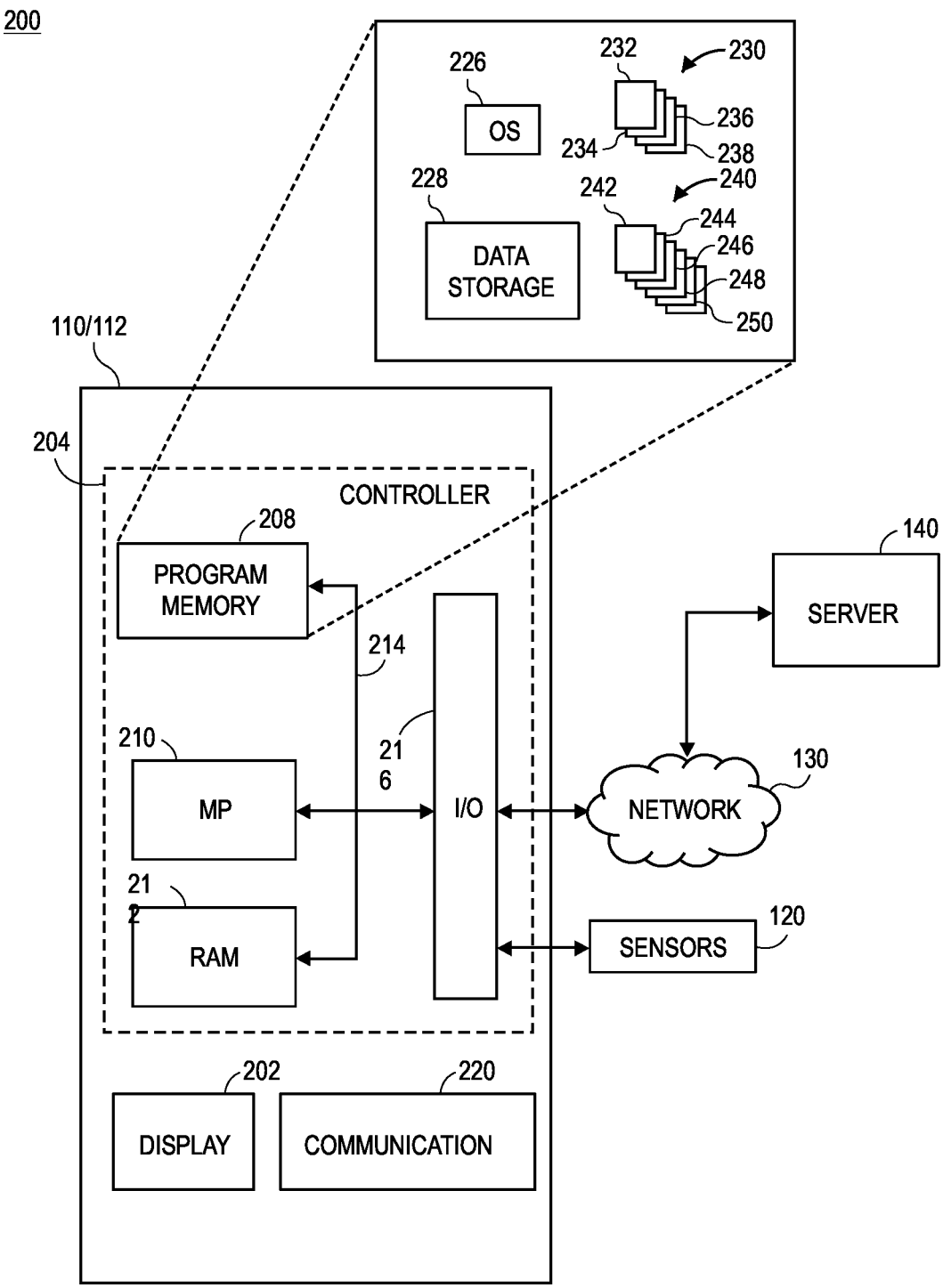
FIG. 2 depicts an exemplary architecture for a mobile device, computing device, or smart device of FIG. 1.

Referring next to FIG. 2, it should be appreciated that while FIG. 2 depicts a smart device 110 and/or mobile device 112 with one microprocessor 210, the controller 204 may include multiple microprocessors 210. Additionally, the memory of the controller 204 may include multiple RAMs 212 and multiple program memories 208. Further, although FIG. 2 depicts the I/O circuit 216 as a single block, the I/O circuit 216 may include a number of different types of I/O circuits. For example, the controller 204 may implement the RAM 212 and the program memory 208 as semiconductor memory, magnetically readable memory, or optically readable memory.

The one or more processors 210 may be adapted and configured to execute any one of the plurality of software applications 230 or any of the plurality of software routines 240 residing in the program memory 204 or elsewhere. One of the plurality of applications 230 may include a home scoring application 232 that may be implemented as a series of machine-readable instructions for performing the various tasks associated with implementing one or more of the operation features according to the home scoring application.

Another of the plurality of applications 230 may include a shopping home score application 234 that may be implemented as a series of machine-readable instructions. Another application of the plurality of applications 230 may include a building and/or property development home score application 236 that may be implemented as a series of machine-readable instructions.

Another application of the plurality of applications 230 may include a home characteristic data and/or level of risk evaluator 238 that may be implemented as a series of machine-readable instructions. Depending on the embodiments, the plurality of software applications 230 may not perform the actual calculations, but instead facilitate the transfer of home telematics data and/or user telematics data and the results of any calculations between the smart device 110 and/or mobile device 112 and the request server 140 by way of the network 130.

The plurality of software applications 230 may cooperate with any of the plurality of software routines 240 to perform functions relating to analysis, evaluation, and/or scoring of home telematics data and/or user telematics data. In some embodiments, one of the plurality of software routines 240 may be a home characteristic data routine 242 that determines and/or generates home characteristic data from home telematics data and/or user telematics data.

Another of the plurality of software routines may be a level of risk and/or risk score routine 244 that determines and/or generates a level of risk and/or a risk score from the home telematics data and/or user telematics data. Another of the plurality of software routines 240 may be a home score factor route 246 to generate a home score from the home characteristic data and/or the risk score.

Still another of the plurality of software routines 240 may be a reporting routine 248 that reports the home telematics data and/or user telematics data to the request server 140 via the network 130. Similarly, one of the plurality of software routines 240 may be a home telematics data and/or user telematics data gathering routine 250 that gathers the home telematics data and/or user telematics data from the smart device 110 and/or mobile device 112. Depending on the embodiment, the plurality of software routines 240 additionally or alternatively causes the request server 140 or sensors 120 to perform functions in addition to or in place of the smart device 110 and/or mobile device 112.

Any of the plurality of software routines 240 may be designed to operate independently of the software applications 230 or in conjunction with the software applications 230 to implement modules associated with the methods discussed herein using the microprocessor 210 of the controller 204. Additionally, or alternatively, the software applications 230 or software routines 240 may interact with various hardware modules that may be installed within or connected to the mobile device 112 or the smart device 110. Such modules may implement some or all of the various exemplary methods discussed herein or other related embodiments.

For instance, such modules may include a module for gathering home telematics data and/or user telematics data from sensors 120, a module for transmitting home telematics data and/or user telematics data to a request server 140, a module for determining a likelihood of risk, a module for calculating home score factors for a property 116, a module for calculating a risk score for a property 116, a module for calculating an overall home score for a property, a module for displaying the home score for the property 116 to a user, and/or other modules.

When gathering and/or transmitting home telematics data and/or user telematics data, the controller 204 of the smart device 110 and/or mobile device 112 may implement a home telematics data and/or user telematics data gathering module by one of the plurality of software applications 230 to communicate with the sensors 120 to receive home telematics data and/or user telematics data as described herein. In some embodiments, including external source communication via the communication unit 220, the controller 204 may further implement a communication module based upon one of the plurality of software applications 230 to receive information from external sources. Some external sources of information may be connected to the controller 204 via the network 130, such as internet-connected third-party databases (not shown). Although the plurality of software applications 230 are shown as separate applications, it is to be understood that the functions of the plurality of software applications 230 may be combined or separated into any number of the software applications 230 or the software routines 240.

In some embodiments, the controller 204 may further implement a reporting module by one of the plurality of software applications 230 to communicate home telematics data and/or user telematics data with the request server 140. The home telematics data and/or user telematics data may be received and stored by the request server 140, and the request server 140 may then use the home telematics data and/or user telematics data to calculate home characteristic data, level risk and/or risk score, home score factors, and/or a home score. In some embodiments, the smart device 110 and/or mobile device 112 then displays a home score to a user on a display 202.

Some example of sensors 120 operatively coupled to the mobile device 112 and/or the smart device 110 include a GPS unit, an optical sensor, a gyroscope, a microphone, an image capturing device, etc., which may provide information relating to the property 116 and relevant home telematics data and/or user telematics data. In some specific instances, the sensors 120 may also be used to monitor power consumption, water consumption, temperature, wind pressure, power generation, etc. It should be appreciated that the aforementioned types of sensors and measurable metrics are merely examples and that other types of sensors and measureable metrics are additionally envisioned.

Furthermore, the communication unit 220 may communicate with databases, other smart devices and/or mobile devices, or other external sources of information to transmit and receive information relating to the home score and home telematics data and/or user telematics data. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Additionally, the communication unit 220 may provide input signals to the controller 204 via the I/O circuit 216. The communication unit 220 may also transmit sensor data, device status information, control signals, and/or other output from the controller 204 to one or more external sensors within the smart devices 110, mobile devices 112, and/or request servers 140.

The mobile device 112 and/or the smart device 110 may include a user-input device (not shown) for receiving instructions or information from a user, such as settings relating to the home score generation features. The user-input device (not shown) may include a "soft" keyboard that is presented on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

It will be understood that the above disclosure is one example and does not necessarily describe every possible embodiment. As such, it will be further understood that alternate embodiments may include fewer, alternate, and/or additional steps or elements.

Figure 3:
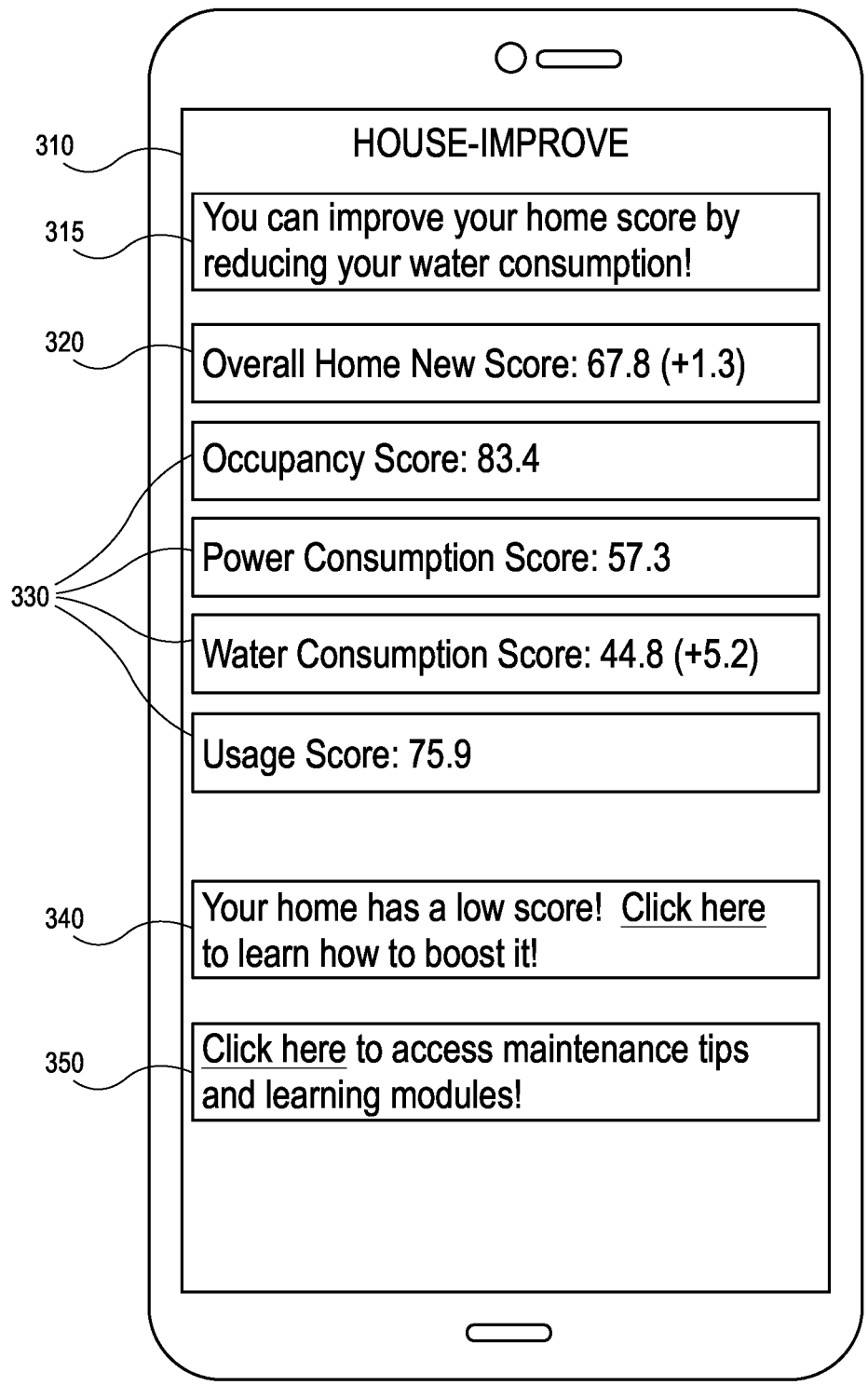
FIG. 3 depicts an exemplary interface for depicting and displaying a home score and improvements for a property, as well as related home score factors that influence the overall home score in the network of FIG. 1.

Exemplary Home Score Modification and Recommendation Applications and Interfaces FIG. 3 illustrates an interface 300 that displays a page 310 of an application or a website providing information for improving a house to a user. The page 310 may include a home score 320 and home score factors 330 that contribute to the overall home score 320. Although FIG. 3 illustrates four home score factors, it will be understood that a page 310 may provide any suitable number of home factors 330, including none or all applicable home factors 330. In some embodiments, the page 310 may further include an indication of a particular improvement to the property 116 as well as links 340 and/or 350 to additional material for improving the home score.

In some embodiments, the home score 320 is based upon the home score factors 330. In such embodiments, the system 100 may calculate the home score factors 330 based upon home telematics data and/or user telematics data. In particular, the system 100 may retrieve home telematics data related to the property 116 and/or user telematics data related to the user from one or more databases. In some embodiments, the one or more databases may be publically accessible databases, such as government databases, locale databases, weather databases, etc. In further embodiments, the one or more databases may additionally or alternatively be privately accessible databases, such as insurance databases, hazard databases, construction databases, building databases, data vendor databases, aerial or ground picture databases, etc. Depending on the embodiment, the system 100 then calculates the home score factors based upon the gathered data, as described in more detail with regard to FIG. 6 below.

Further, the interface 300 may display home characteristic data determined from the home telematics data and/or user telematics data as the home score factor data. In some embodiments, the interface 300 displays the home score factors that the system 100 determines to be most relevant to the home score 320. In further embodiments, the interface 300 displays the home score factors 330 that the system 100 determines to be most relevant to the home score 320, and the interface 300 further displays the home score factor data that is most relevant to the chosen home score factors 330.

In some embodiments, the home score factors 330 may include individual scores related to each home score factor 330. Depending on the embodiment, the scores for the home score factors 330 may be scores used to determine the home score 320. In other embodiments, the system 100 may determine the home score 320 based upon the home score factors 330, but not necessarily on the displayed scores. In such embodiments, the system may calculate the displayed scores alongside the home score 320.

In further embodiments, the home score 320 and/or home score factors 330 are a modified home score and modified home score factors, respectively. In such embodiments, the interface 300 may display a change in score in addition to the home score 320 and/or home score factors. In other embodiments, the interface 300 may display the old score and the new score where appropriate.

In some embodiments, the links 340 and 350 may include links 340 for recommended home modification actions and/or links 350 for general lessons and/or tips related to the property 116. In some embodiments, the links 340 and 350 are interchangeable and/or mixed. In other embodiments, the links 340 and 350 are separated based upon whether the recommendations would modify the home score if implemented by the user.

It will be understood that the above disclosure is one example and does not necessarily describe every possible embodiment. As such, it will be further understood that alternate embodiments may include fewer, alternate, and/or additional steps or elements.

Figure 4:
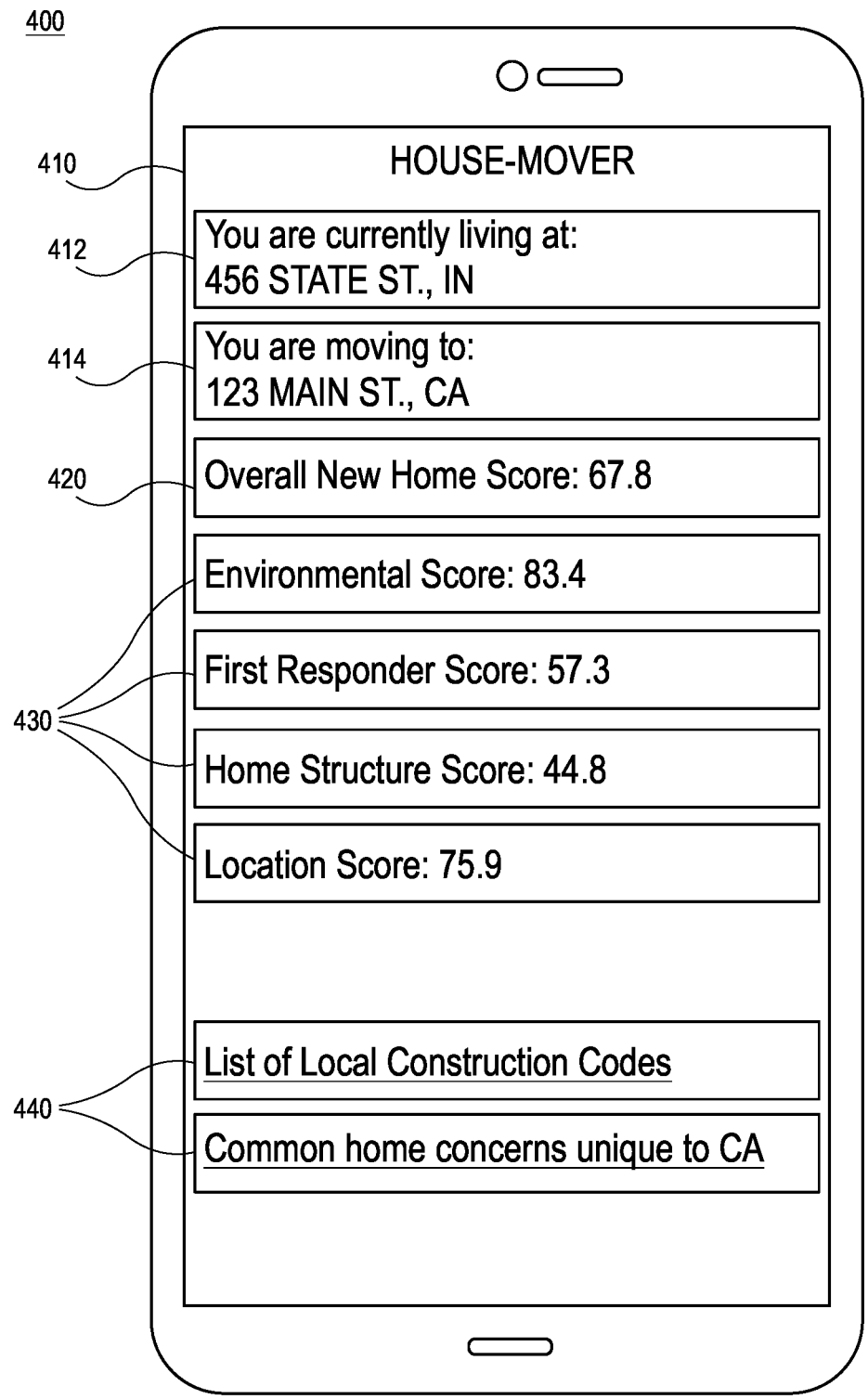
FIG. 4 depicts an exemplary interface for depicting and displaying a moving home score for a property, as well as related home score factors that influence the overall home score in the network of FIG. 1.

FIG. 4 illustrates an interface 400 that displays a page 410 of an application or a website providing information for user moving to a property 116. In particular, the page 410 provides an overall home score 420 (in this case, 67.8) and home score factors 430. Although FIG. 4 illustrates four home score factors, it will be understood that a page 410 may provide any suitable number of home factors 430, including none or all applicable home factors 430.

In some embodiments, the overall home score 420 is based upon the home score factors 430. In such embodiments, the system 100 may calculate the home score factors 430 based upon home telematics data. In particular, the system 100 may retrieve home telematics data related to the property from one or more databases. In some embodiments, the one or more databases may be publically accessible databases, such as government databases, locale databases, weather databases, etc. In further embodiments, the one or more databases may additionally or alternatively be privately accessible databases, such as insurance databases, hazard databases, construction databases, building databases, etc.

Depending on the embodiment, the system 100 then calculates the home score factors based upon the gathered home telematics data, as described in more detail with regard to FIG. 6 below. In some embodiments, the interface 400 may include only the home score 420 and/or home score factors 430 (e.g., as a pop-up or link on a webpage). In other embodiments, the interface 400 may include other information relevant to the property 116, such as the address, price, pictures of the house, company, etc.

In some embodiments, the interface 400 also displays a past/current address 412 and an address 414 for the property 116. Depending on the embodiment, the past/current address 412 and the address 414 may include an exact address, a town, a state, a country, or any combination thereof. In further embodiments, the past/current address 412 and the address 414 may include information as to the environment and/or location of the properties in question (e.g., rural, hilly area or urban, mountainous area). In further embodiments, the system 100 may determine differences between the past/current address 412 and the address 414. In such embodiments, the interface 400 may display links 440 to important differences and/or important local information to the property 116.

It will be understood that the above disclosure is one example and does not necessarily describe every possible embodiment. As such, it will be further understood that alternate embodiments may include fewer, alternate, and/or additional steps or elements.

Figure 5:
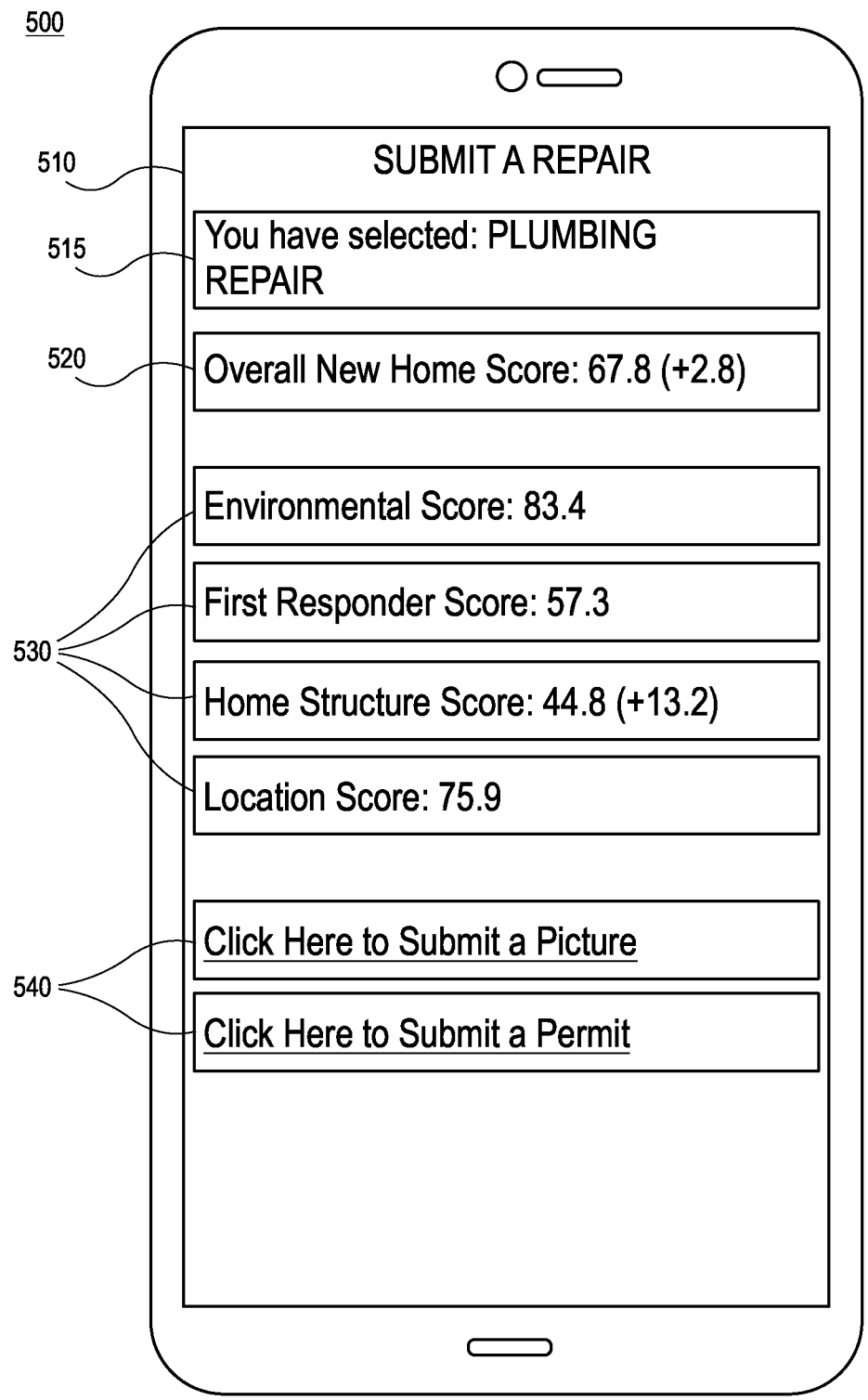
FIG. 5 depicts an exemplary interface for submitting proof of a maintenance task performed for a property, as well as displaying resulting modifications to a home score and related home score factors that influence the overall home score in the network of FIG. 1.

FIG. 5 illustrates an exemplary interface 500 that displays a page 510 of an application or a website providing information for a house to a user. In particular, the page 510 provides an overall home score 520 (in this case, 77.7) and home score factors 530. Although FIG. 5 illustrates four home score factors, it will be understood that a page 510 may provide any suitable number of home factors 530, including none or all applicable home factors 530. Moreover, the page 510 may further provide a listed task 515 as well as links 540 to submit evidence of a repair and/or maintenance task. In such embodiments, a user may upload evidence of a repair and/or maintenance task as an indication of a home modification, which may modify the home score 520 and/or home score factors 530 as described herein. In some embodiments, the home score 520 and/or home score factors 530 include a projected or actual modification based upon the repair in question.

In some embodiments, the home score 520 and/or home score factors 530 are similar to the home score 320 and/or home score factors 330 as described above with regard to FIG. 3. Further, it will be understood that, although the overall home score 320, 420, and 520; home score factors 330, 430, and 530; and other such descriptions herein refer to a "home", each may refer to land on a property, regardless of whether developed or undeveloped. As such, it will be understood that the embodiments discussed herein are not limited to physical buildings.

Further, it will be understood that, although FIGS. 3-5 depict mobile devices and interfaces, depending on the embodiment, the system 100 may notify a user through email, text, an application, a webpage, a brochure/newsletter, a phone call, or any other similar technique.

It will be understood that the above disclosure is one example and does not necessarily describe every possible embodiment. As such, it will be further understood that alternate embodiments may include fewer, alternate, and/or additional steps or elements.

Figure 6:
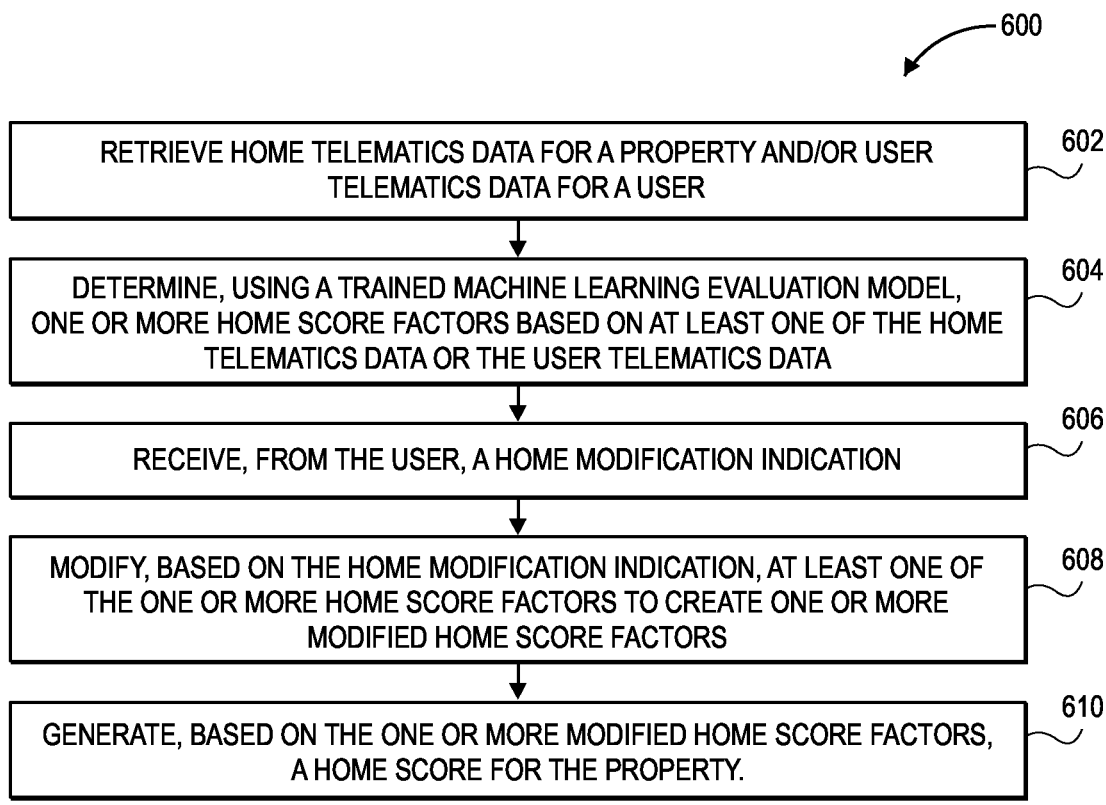
FIG. 6 depicts a flow diagram representing an exemplary computer-implemented method for evaluating and analyzing home data before generating a modified home score based upon the home data.

Exemplary Methods for Evaluating Home Data to Generate A Home Score for a Property, Modifications, or Recommendations FIG. 6 is a flow diagram of an exemplary computer-implemented method 600 for evaluating and analyzing home data before generating a modified home score based upon the home data (e.g., home telematics data). The method 600 may be implemented by one or more processors of a computing system such as request server 140 or mobile device 112. Alternatively or additionally, the method 600 may be implemented by one or more processors of a distributed system such as system 100 and/or various components of system 100 as described with regard to FIG. 1 above.

At block 602, the system 100 may retrieve home data (e.g., home telematics data) for a property 116 and/or user data (e.g., user telematics data) for a user. In some embodiments, the home telematics data may be data collected from one or more publically accessible databases, such as a government database, a weather database, a location database, etc. In further embodiments, the home telematics data may be data collected from privately accessible databases with permission from an owner of the private database, such as accessing a risk profile from an insurance database, a hazard database, an environmental database, etc. In other embodiments, the system 100 may retrieve the home telematics data from one or more smart devices, such as smart device 110. In such embodiments, the home telematics data may be provided by a property owner who opts in to allow the smart device 110 to provide such information.

In further embodiments, the system 100 may similarly gather the user telematics data from a publically accessible database or a private database. Depending on the embodiment, the user may transmit the user telematics data to the system 100 and/or transmit permission for the system 100 to access the user telematics data. In some embodiments, the user telematics data may include past/current home data, past/current claims data, indicia of likelihood of risk for the user, etc.

In some embodiments, the system 100 may collect data from a smart device 110 regarding the internal and/or external environment of the property 116. In some embodiments, the system 100 may use data collected from the smart device 110 and/or sensors 120 to determine a home usage (e.g., frequency of use, wear, potential damage, need for maintenance, etc.) and/or a home occupancy (e.g., time spent away, time spent with utilities on/off, time with guests in residences, times with homeshare residents in residence, etc.) for the property 116. In further embodiments, a mobile device 112 may additionally or alternatively collect such information and/or the system 100 collects such information from a mobile device 112.

In some embodiments, the system 100 may automatically detect routine maintenance. In some embodiments, the system 100 may determine that routine maintenance occurs when components of the property 116 continue functioning above a predetermined threshold of efficiency and/or efficacy. In other embodiments, the system may determine that routine maintenance occurs by cross-referencing data, such as permit data, sensor data, user input, uploaded financial data, etc. In further embodiments, the system 100 may notify a user about potential issues that may be addressed (e.g., in response to data such as from a smart device 110 and/or in response to a regular schedule/alarm), and the system may determine that maintenance has been performed in response to an indication from the user.

At block 604, the system 100 may determine, using a trained machine learning evaluation model or a suite of trained machine learning models, one or more home score factors based upon at least one of the home telematics data or the user telematics data. In some embodiments, the system 100 may determine the one or more home score factors by analyzing the home telematics data and/or user telematics data using a machine learning model to determine home characteristic data for the property 116 or user characteristic data. Depending on the embodiment, the home characteristic data may be any of location data, environment data, first responder data, home structure data, adherence to local construction codes, average power consumption, average water consumption, security data, occupancy data, detected hazards, predicted hazards, alarm data, or any other similarly suitable data for determining a home score. Similarly, the user characteristic data may include past home characteristic data for properties owned or previously lived in by the user, claims arising from any hazards associated with properties associated with the user, a past home score for the user, or any other such data from the user.

In some embodiments, the system 100 may receive the home characteristic data or user characteristic data outright in the form of home or user telematics data and analyzes the received home or user characteristic data to determine the factors. In other embodiments, the system 100 may receive larger quantities and/or ranges of home or user telematics data and determines what data qualifies as home or user characteristic data before discarding unimportant data. In some such embodiments, the system 100 may make such a determination by using a trained machine learning model, as described herein.

In some embodiments, the system 100 may further analyze the home telematics data using the trained machine learning data evaluation model to determine a likelihood of loss associated with the property 116. Depending on the embodiment, the system 100 may determine the likelihood of loss associated with the property based upon claims data in the home data, such as type of claim, cost of claim, cause of the claim, confirmation of fault, liability amount paid out, property damage paid out, freeform data (need to understand that from a data perspective, so needs other processing), coverage is paid, catastrophe, bodily injury, repair costs, estimated values for items damaged, prior damage, claim subrogation status, location of loss, date of loss, time of loss, date the claim was reported, etc.

Further, the system 100 may determine, based upon the home characteristic data for the property and/or the user characteristic data for the user, the one or more home score factors. In embodiments in which the system 100 determines a likelihood of loss associated with the property, the system 100 may further determine the one or more home score factors based upon the likelihood of loss in addition to or in place of the home characteristic data and/or user characteristic data. In such embodiments, the one or more home score factors may include a risk score for the property 116, where the risk score may represent the potential for a claim to occur with regard to the property 116. In such embodiments, the system 100 may use the likelihood of loss and/or claims data pulled from an insurance database to anticipate the likelihood of a claim using the machine learning model. In particular, the system 100 may use either or both of individual claim data related to a particular property 116, or anonymized and/or historical claim data for a broader class of properties.

In such embodiments, the system 100 may train the machine learning model by analyzing large quantities of home telematics data to determine whether various characteristics of a property 116 make the property more or less likely for a claim to occur. For example, the machine learning model of the system 100 may learn that houses closer to first responders are more or less likely to be robbed. Similarly, the machine learning model of the system 100 may make similar determinations with regard to building materials and/or durability, weather, the environment, age of the property, etc.

The system 100 may then use the machine learning model to calculate a risk score for the property 116 that anticipates the likelihood of a claim occurring that relates to and/or arises from the property 116. In some embodiments, the risk score may be a decimal from 0 to 1, a number from 0 to 10, a number from 0 to 100, or any other suitable format for a score.

In some implementations, a home score component model may include home score factors such as a fire risk factor, a safety risk factor, a weather or climate risk factor, a property attribute risk factor, and a potential home hazard risk factor. In some further such implementations, each of the risk score factors may be weighted equally (e.g., 20% for each of the fire, safety, weather, property attribute, and potential home hazard risk factors). Further, each hazard may have a risk score ranging from 0 to 1, 0 to 10, 0 to 100, or any other suitable format.

In further implementations, the home score factors of the home score component model may be based upon the likelihood of the home in question having a claim, the likelihood of a hazard occurring, past hazard data associated with homes having similar characteristics or layouts, etc. As such, the machine learning model(s) may generate the home score factors using user data and/or hazard data as described herein. Depending on the implementation, the system 100 may generate and/or weight the home score factors differently depending on the home score component model. For example, in embodiments where the home score factors are based upon the likelihood of the home in question having a claim, the system 100 may generate a fire risk factor as having a risk score of 20 out of 100 if the risk of a claim resulting from fire is low (e.g., a brick house with smart electric appliances). Similarly, the system 100 may generate some home score factors based on past historical data for the home in question and generate a potential home hazard risk factor by determining the likelihood of a home having a claim. In some such implementations the system 100 may weight the home score factor based upon the likelihood of a claim higher than the home score factors based upon past historical data.

In embodiments in which the system 100 generates and/or weights the home score factors depending on past hazard data associated with homes having similar characteristics, the system 100 may determine a risk score associated with a home score factor according to received home telematics data associated with other homes. For example, in some embodiments, the system 100 may determine that a home score factor for fire for a wooden house should be high because houses made of similar materials have a propensity for fire hazards. In further embodiments, the system 100 may determine that fires are unlikely for the current home due to a mitigating factor not present in other homes. For example, the system 100 may determine that the proximity to a fire station, a generally damp environment, or homeowner-implemented protections reduce the likelihood of damage due to fire. As such, in some such examples, the system 100 may subsequently modify a weight for the home score factor in question or adjust the risk score for the home score factor to reduce the overall impact on the overall home score. Similarly, depending on the embodiment, the system 100 may determine a severity of a risk in question and adjust the weight or risk score for the home score factor based on the severity. For example, the system 100 may determine that characteristics make the home in question likely to attract small insects, but may rank the severity of such an outcome as low, affecting the home score factor score or weight. Similarly, the system 100 may determine that the bugs the home is likely to attract are termites, and may subsequently weight or rank the home score factor higher.

As another example, the home telematics data may include weather data and the home score factors may include a weather risk factor. In such embodiments, the system 100 may compare the home to local or environmental similar houses. For example, the system 100 may compare the structure of a home in California to other homes in the area for purposes of hurricanes, earthquakes, wildfire, etc. The system 100 may decline to compare the structure of the home to homes in Illinois, which may instead be structured for tornados, blizzards, etc. instead. The system 100 may, similar to the above, determine that a homeowner or prospective homeowner may take action to modify the home score factor weight or risk score and may alert the homeowner or prospective homeowner as to the actions and/or by how much taking the actions in question will modify the home score factor or overall home score.

In further embodiments, the system 100 may determine that one or more homeowner additions to the home increase or decrease the weight or risk score for the home score factor in question. For example, a pool enclosing, a home intruder alarm system, a sprinkler system, etc. may reduce the risk and the system 100 may adjust the corresponding home score factor accordingly. In still further embodiments, the system 100 may determine an action a homeowner or potential homeowner can take to improve a home score factor based upon a determination as to how much the home score factor in question would change.

The system 100 may then generate a home score based on the home score factors generated in block 604. In some embodiments, the system 100 may additionally or alternatively generate a recommended home modification, as described in more detail below with regard to FIGS. 7 and 8.

At block 606, the system 100 may receive, from the user, a home modification indication. Depending on the embodiment, the home modification may be and/or may include any of an indication of completing a learning module, an indication of repairing a component of the property 116, an indication of regular maintenance on the property 116, an indication of a new building being built, an indication of a permit associated with the property 116, an indication of extreme weather, an indication of the user moving to a new property, an indication of differences between a past property of a user and the property 116, an indication of an addition of an extension to the property 116, an indication of a change in first responder presence near the property 116, an average power consumption for the property 116, an average water consumption for the property 116, an average occupancy for the property 116, an average usage for the property 116, and any other suitable indication that may affect a home score as described herein.

In some embodiments, the indication may be or include completion of a learning module. The learning module may educate a homeowner or buyer on how to care for the new home and/or mitigate losses. The module may include general homecare tips and/or tailored information for the particular property 116. In further embodiments, the modules may include differences in coverage and what criteria would cause different coverage to be needed, as well as what the criteria may affect (such as automobile insurance rates) and prices of such.

In other embodiments, the indication may be in response to a notification by the system 100 to repair or maintain a component of the property 116. In some such embodiments, the notification may include a list of potential vendors and/or companies to perform the repair and/or maintenance. In further embodiments, the notification may include a link to instructions to perform basic homecare tasks.

At block 608, the system 100 may modify, based upon the home modification indication, at least one of the one or more home score factors to create one or more modified home score factors. In some embodiments, the system 100 may modify the home score factor(s) by feeding the home modification indication and/or data associated with the home modification indication into the machine learning model and determining a new output for each affected home score factor.

In further embodiments, the system 100 may modify the home score factor(s) by determining a change in the home score factor using the machine learning model, and subsequently applying the change to the home score factor(s). In other embodiments, the system 100 may modify the home score factor(s) collectively by determining the overall change in home score according to the home modification indication. In such embodiments, the system 100 may use the machine learning model to determine the overall impact on the home score as reliant on the home score factors directly.

At block 610, the system 100 may generate, based upon the one or more modified home score factors, a home score for the property 116. In some embodiments, the system 100 may determine a particular type of home score to generate for the property 116. For example, in some embodiments, the system 100 may determine the home score is a maintenance home score for a user maintaining the property 116. In other embodiments, the system 100 may determine that the home score is a moving home score for a user looking to move to a property 116.

Depending on the embodiment, the system 100 may generate the home score based upon the determination. For example, the system 100 may weigh the home score factors differently or use different home score factors depending on the determination. In further embodiments, the system 100 makes a determination when analyzing the home data and/or when determining the home score factors at block 604.

In some embodiments, the system 100 may further determine influential home characteristic factors for the home score. Depending on the embodiment, the system 100 may determine the influential home characteristic factors based upon the weight assigned to each home factor. For example, in some embodiments, the system 100 determines the top 1, 5, 10, or any number of factors with the highest weight. In further embodiments, the system 100 determines the weights of the influential home characteristic factors as described above with regard to block 604. In some such embodiments, the system 100 then displays and/or causes a computing device to display the influential home characteristic factors alongside a home score. In some embodiments, the system 100 may display the home score and/or influential home characteristic factors to support an overall quote associated with the home.

It will be understood that the above disclosure is one example and does not necessarily describe every possible embodiment. As such, it will be further understood that alternate embodiments may include fewer, alternate, and/or additional steps or elements.

Figure 7:
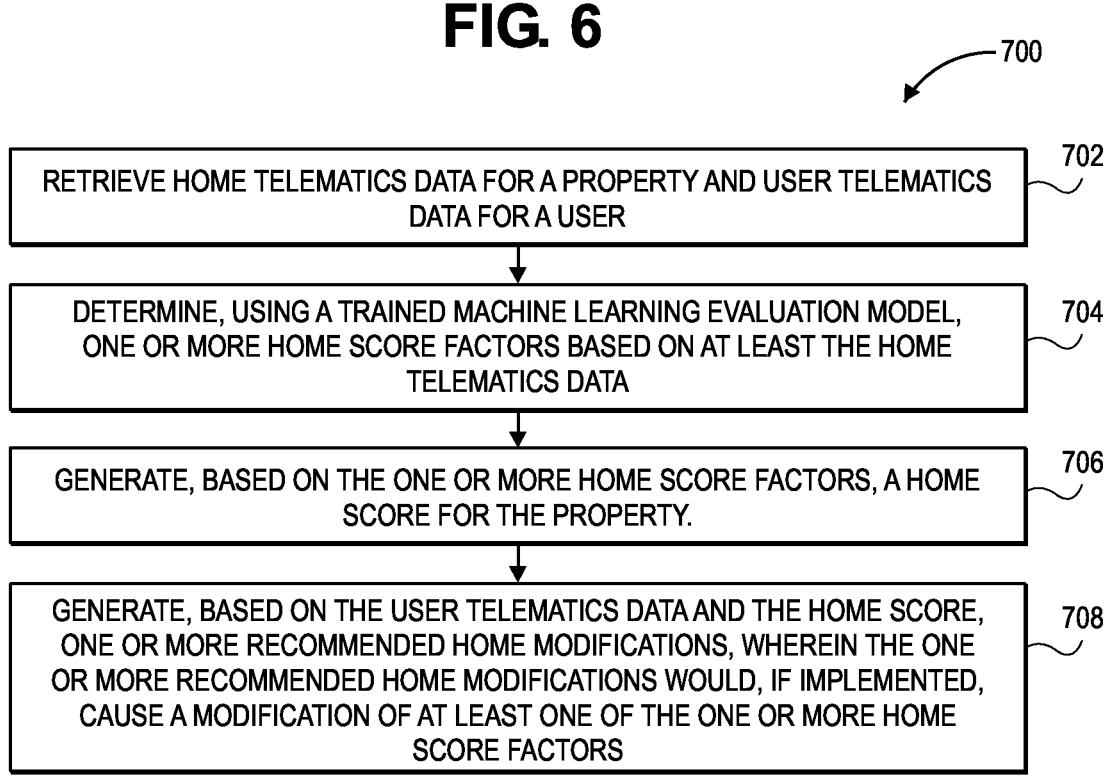
FIG. 7 depicts a flow diagram representing an exemplary computer-implemented method for evaluating home data before generating recommended modifications based upon a home score for the property.

Next, FIG. 7 is a flow diagram of an exemplary computer-implemented method 700 for evaluating home data (e.g., home telematics data) and user data (e.g., user telematics data), as well as generating a home score for a property as well as one or more recommended home modifications based upon the home score. The method 700 may be implemented by one or more processors of a computing system such as request server 114 or mobile device 112. Alternatively or additionally, the method 700 may be implemented by one or more processors of a distributed system such as system 100 and/or various components of system 100 as described with regard to FIG. 1 above.

At block 702, the system 100 may retrieve home telematics data and user telematics data for a property 116, similar to block 602 above. At block 704, the system 100 may determine one or more home score factors based upon at least the home telematics data for the property. In some embodiments, the system 100 may determine the home score factors using similar techniques as method 600. For example, depending on the embodiment, the system 100 may determine the home score factors by analyzing the home telematics data for the property 116 to determine home characteristic data and/or a likelihood of loss, similar to block 604 in FIG. 6 above. As another example, depending on the embodiment, the home score factors may include (i) a fire hazard score, (ii) a safety score, (iii) a weather hazard score, (iv) a property feature hazard score, and (v) a potential hazards score as described in more detail with regard to method 600 above. Similarly, at block 706, the system 100 may generate a home score for the property 116 based upon the home score factors, similar to block 610 in FIG. 6 above.

At block 708, the system 100 may generate one or more recommended home modifications based upon the user telematics data and the home score. In some embodiments, the recommended home modifications would, if implemented, cause a modification of at least one of the one or more home score factors. In further embodiments, the system 100 may determine, based upon the user telematics data, past property data for the user. In such embodiments, the recommended home modifications may be based upon differences between the past property for the user and the property 116. In further implementations, the recommended home modifications may additionally or alternatively be based upon the home score factors, the user data, the hazard data, etc.

Depending on the embodiment, the recommended home modifications may be recommendations for future or ongoing actions (e.g., a recommendation to watch for water filter failure) and/or for immediate actions (e.g., a recommendation to baby-proof the property). For example, in some such embodiments, the recommended home modifications can be recommendations on differences between properties similar to the past property and property 116.

Depending on the embodiment, such differences may include differences in environment, wildlife, first responder time, home construction, location, or any other similar differences. For example, a user moving from a two story house in Indiana to a one story house in California may need to know about local water usage laws and/or different hazards inherent in the new house layout.

In some embodiments, the system 100 may cause a computing device such as mobile device 112 to display the recommendations. In further embodiments, the system 100 may cause a computing device to display evidence, support, and or potential methods of undertaking the recommendation as well. Depending on the embodiment, the recommendation may include an offer for a different insurance plan and/or coverage depending on the differences.

It will be understood that the above disclosure is one example and does not necessarily describe every possible embodiment. As such, it will be further understood that alternate embodiments may include fewer, alternate, and/or additional steps or elements.

Figure 8:
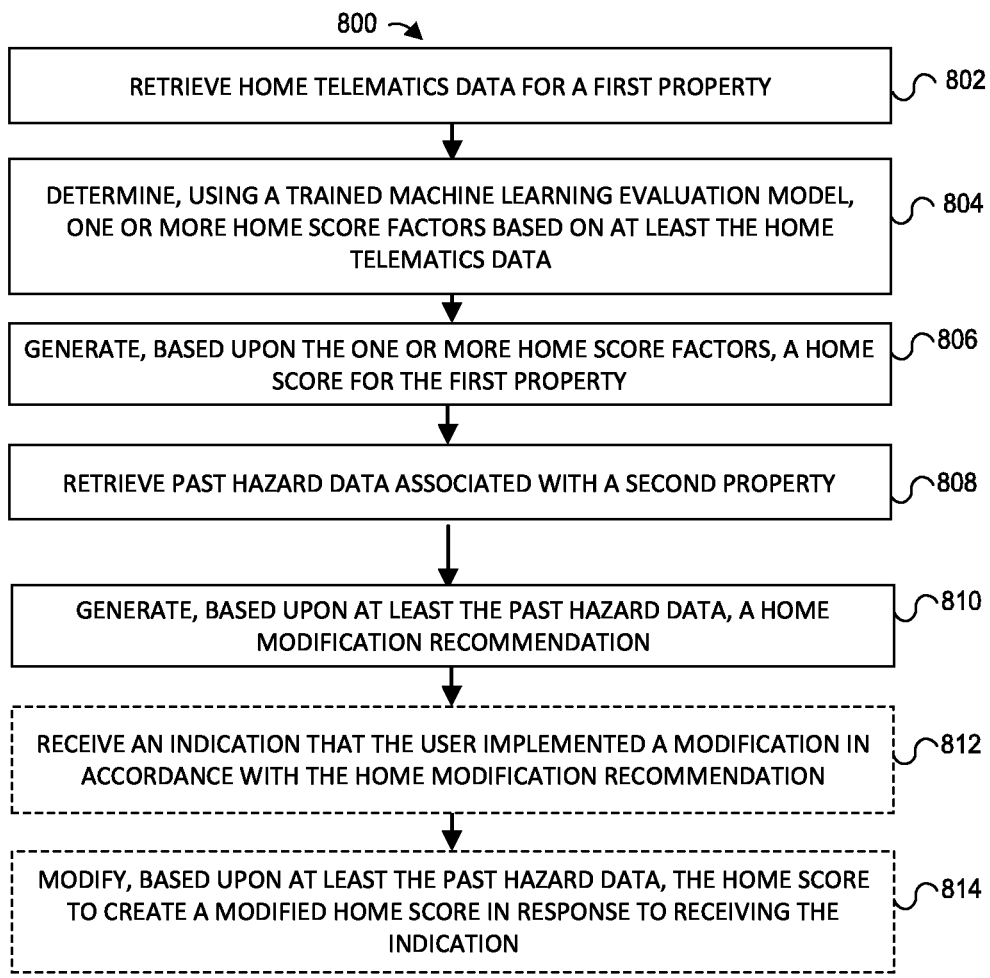
FIG. 8 depicts a flow diagram representing an exemplary computer-implemented method for evaluating home data before generating recommended modifications based upon the home data and data for a similar property.

Next, FIG. 8 is a flow diagram of an exemplary computer-implemented method 800 for evaluating, modifying, and providing recommendations regarding a home score for a property based upon another, similar property. The method 800 may be implemented by one or more processors of a computing system such as request server 114 or mobile device 112. Alternatively or additionally, the method 800 may be implemented by one or more processors of a distributed system such as system 100 and/or various components of system 100 as described with regard to FIG. 1 above.

At block 802, the system 100 may retrieve home telematics data for a first property 116, similar to blocks 602 and 702 above. At block 804, the system 100 may determine one or more home score factors for the first property based at least on the home telematics data, similar to blocks 604 and 704 above. At block 806, the system 100 may generate, based on the one or more home score factors, a home score for the first property, similar to block 706 above.

At block 808 the system 100 may retrieve past hazard data associated with the second property. Depending on the embodiment, the past hazard data may be or include past accident data, home score factors, historical claims data, home characteristic data, etc. In some embodiments, the system 100 may retrieve the past hazard data directly from a database or other such source. In other embodiments, the system 100 retrieves some past hazard data, such as home characteristic data or historical claims data, and generate other past hazard data, such as home score factors, using the techniques described herein. In some such embodiments, the system 100 generates the other past hazard data using a machine learning algorithm.

Depending on the embodiment, the system 100 may first determine that the first property 116 shares one or more home characteristics with a second property. Depending on the embodiment, the system 100 may automatically compare the first property 116 to properties in a database, such as a public database including a local listing of houses or a private database including a wider variety of houses insured by a company. In further embodiments, the system 100 may make the determination responsive to an indication from a user. In some embodiments, the system 100 may determine that the first property 116 shares one or more home characteristics by extracting and analyzing home data as described herein. For example, the system 100 may determine the second property includes buildings with similar materials, a similar environment, similar surrounding foliage and/or fauna, a similar layout, etc. In some implementations, the determination as to whether the second property and the first property 116 share similar characteristics is made using a machine learning algorithm as described herein. In further implementations, a user or personnel may manually indicate and/or approve which characteristics to consider as similar.

At block 810, the system 100 may generate a home modification recommendation based at least upon the past hazard data. Depending on the embodiment, the home modification recommendation may be include an improvement in the second property compared to the first property, as determined by comparing home score factors for each property. For example, if the second property has a higher fire hazard score than the first property because of a greater number of smoke alarms, the home modification recommendation may include a recommendation to install more smoke alarms. In further embodiments, the home modification recommendation may include a recommendation recommended to and/or implemented by an owner of the second property that would and/or has caused an improvement to a home score for the second property.

At block 812, the system 100 may receive an indication that the user implemented a modification in accordance with the home modification recommendation. Depending on the embodiment, the indication may be or include a signal from a smart device associated with the home modification recommendation (e.g., a notification that the user has changed a filter, a notification that the user has installed a new sensor and/or detector, etc.). In further embodiments, the indication may be or include a notification directly from the user, such as through an application associated with the home modification recommendation. In such embodiments, the user may include evidence of the modification, such as a receipt, a picture of the modification, etc. In still further embodiments, the indication may be or include a notification from an assessor or an otherwise unbiased personnel who confirms the presence of the modification.

At block 814, the system 100 may modify, based upon at least the past hazard data, the home score to create a modified home score. In some embodiments, the system 100 may modify the home score responsive to receiving the indication at block 812. In embodiments in which the system 100 requires verification of the modification (e.g., when the user submits a modification without evidence, etc.), the system 100 may modify the home score responsive to receiving verification of the modification. Depending on the embodiment, the system 100 may verify whether the modification occurred, to what degree the modification occurred, whether the modification improves the relevant home score factor, etc. When modifying the home score, the system 100 may calculate a new set of home score factors as described herein with the modification taken into account. In further embodiments, the system 100 may alternatively modify the home score based on a modification to a home score for the second property for a similar modification. For example, if the second home score raised two points by installing smoke detectors, the system 100 may determine to implement a similar change to the first home score by performing the same modification.

In some embodiments, the system 100 may otherwise generate the modified home score as described herein. Similarly, the system 100 may receive a request for the home score from a user and may display the modified home score for the property 116 responsive to the request.

It will be understood that the above disclosure is one example and does not necessarily describe every possible embodiment. As such, it will be further understood that alternate embodiments may include fewer, alternate, and/or additional steps or elements.

Additional Considerations

With the foregoing, a user may opt-in to a rewards, insurance discount, or other type of program. After the insurance customer provides their affirmative consent, an insurance provider remote server may collect data from the user's mobile device, vehicle, smart home, wearables, smart glasses, or other smart devices—such as with the customer's permission or affirmative consent. The data collected may be related to home telematics data, user telematics data, smart devices, accident data, and/or insured assets before (and/or after) an insurance-related event, including those events discussed elsewhere herein. In return, risk averse insureds, homeowners, home builders, or other such individuals may receive discounts or insurance cost savings related to personal articles, auto, and other types of insurance from the insurance provider.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

The term "insurance policy," "insurance plan," or variations thereof as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home insurance policies, it should be appreciated that an insurance provider may offer or provide one or more different types of insurance policies. Other types of insurance policies may include, for example, vehicle and/or automobile insurance; homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluating properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for evaluating and gamifying maintenance for a property by a user, the computer-implemented method comprising:
   retrieving, by one or more processors, home data for a first property;
   determining, by the one or more processors and using a first trained machine learning evaluation model, one or more home score factors based upon at least the home data;
   weighting, by the one or more processors, each of the one or more home score factors to generate one or more weighted home score factors;
   generating, by the one or more processors and based upon the one or more weighted home score factors, a home score for the first property;
   determining, by the one or more processors and using a second trained machine learning evaluation model, that one or more additional properties are similar to the first property;
   retrieving, by the one or more processors, past hazard data associated with a second property of the one or more additional properties;
   generating, by the one or more processors and based upon at least the past hazard data and at least one of the one or more weighted home score factors, a home modification recommendation for the first property; and
   performing, by the one or more processors and responsive to an indication to train the first trained machine learning evaluation model including a condition that the home score is accurately representative of the first property, additional training of the first trained machine learning evaluation model using at least (1) the one or more home score factors, (ii) the home data for the first property, and (iii) home data for at least some of the one or more additional properties.

2. The computer-implemented method of claim 1, further comprising:
   receiving an indication that the user implemented a modification in accordance with the home modification recommendation; and
   modifying, based upon at least the past hazard data, the home score to create a modified home score in response to receiving the indication.

3. The computer-implemented method of claim 1, wherein each of the one or more home score factors has an equal weight.

4. The computer-implemented method of claim 1, wherein the one or more home score factors are one or more first home score factors and generating the home modification recommendation includes:
   determining one or more second home score factors based on at least the past hazard data;
   comparing the one or more second home score factors with the one or more first home score factors to determine a particular second home score factor is greater than a corresponding first home score factor; and
   generating the home modification recommendation such that the home modification recommendation corresponds to the particular second home score factor.

5. The computer-implemented method of claim 1, wherein the home score is a first home score, and generating the home modification recommendation includes:
   determining, based upon at least the past hazard data, a home modification implemented for the second property that caused an improvement to a second home score corresponding to the second property; and
   generating the home modification recommendation such that the home modification recommendation includes the determined home modification.

6. The computer-implemented method of claim 5, further including:
   modifying the home score based at least upon the improvement to the second home score.

7. The computer-implemented method of claim 1, wherein the one or more home score factors include: (i) a fire hazard score, (ii) a safety score, (iii) a weather hazard score, (iv) a property feature hazard score, and (v) a potential hazards score.

8. A computing device for evaluating and gamifying maintenance for a property by a user, the computing device comprising:
   one or more processors;
   a communication unit; and
   a non-transitory computer-readable medium coupled to the one or more processors and the communication unit and storing instructions thereon that, when executed by the one or more processors, cause the computing device to:
   retrieve home data fora first property;
   determine, using a first trained machine learning evaluation model, one or more home score factors based upon at least the home data;
   weight each of the one or more home score factors to generate one or more weighted home score factors;
   generate, based upon the one or more weighted home score factors, a home score for the first property;
   determine, using a second trained machine learning evaluation model, one or more additional properties as similar to the first property;
   retrieve past hazard data associated with a second property of the one or more additional properties;
   generate, based upon at least the past hazard data and at least one of the one or more weighted home score factors, a home modification recommendation for the first property; and
   perform, responsive to an indication to train the first trained machine learning evaluation model including a condition that the home score is accurately representative of the first property, additional training of the first trained machine learning evaluation model using at least (i) the one or more home score factors, (ii) the home data for the first property, and (ill) home data for at least some of the one or more additional properties.

9. The computing device of claim 8, wherein the non-transitory computer-readable medium further stores instructions that, when executed by the one or more processors, cause the computing device to:
   receive an indication that the user implemented a modification in accordance with the home modification recommendation; and
   modify, based upon at least the past hazard data, the home score to create a modified home score in response to receiving the indication.

10. The computing device of claim 8, wherein each of the one or more home score factors has an equal weight.

11. The computing device of claim 8, wherein the one or more home score factors are one or more first home score factors, and generating the home modification recommendation includes:
  determining one or more second home score factors based on at least the past hazard data;
  comparing the one or more second home score factors with the one or more first home score factors to determine a particular second home score factor is greater than a corresponding first home score factor; and
  generating the home modification recommendation such that the home modification recommendation corresponds to the particular second home score factor.

12. The computing device of claim 8, wherein the home score is a first home score, and generating the home modification recommendation includes:
  determining, based upon at least the past hazard data, a home modification implemented for the second property that caused an improvement to a second home score corresponding to the second property; and
  generating the home modification recommendation such that the home modification recommendation includes the determined home modification.

13. The computing device of claim 12, wherein the non-transitory computer-readable medium further stores instructions that, when executed by the one or more processors, cause the computing device to:
  modify the home score further based at least upon the improvement to the second home score.

14. The computing device of claim 8, wherein the one or more home score factors include: (i) a fire hazard score, (ii) a safety score, (iii) a weather hazard score, (iv) a property feature hazard score, and (v) a potential hazards score.

15. A tangible, non-transitory computer-readable medium storing instructions for evaluating and gamifying maintenance for a property by a user that, when executed by one or more processors of a computing device, cause the computing device to:
  retrieve home data fora first property;
  determine, using a first trained machine learning evaluation model, one or more home score factors based upon at least the home data;
  weight each of the one or more home score factors to generate one or more weighted home score factors;
  generate, based upon the one or more weighted home score factors, a home score for the first property;
  determine, using a second trained machine learning evaluation model, one or more additional properties as similar to the first property;
  retrieve past hazard data associated with a second property of the one or more additional properties;
  generate, based upon at least the past hazard data and at least one of the one or more weighted home score factors, a home modification recommendation for the first property; and
  perform, responsive to an indication to train the first trained machine learning evaluation model including a condition that the home score is accurately representative of the first property, additional training of the first trained machine learning evaluation model using at least (i) the one or more home score factors, (ii) the home data for the first property, and (411) home data for at least some of the one or more additional properties.

16. The tangible, non-transitory computer-readable medium of claim 15, wherein the tangible, non-transitory computer-readable medium further stores instructions that, when executed by the one or more processors, cause the computing device to:
  receive an indication that the user implemented a modification in accordance with the home modification recommendation; and
  modify, based upon at least the past hazard data, the home score to create a modified home score in response to receiving the indication.

17. The tangible, non-transitory computer-readable medium of claim 15, wherein each of the one or more home score factors has an equal weight.

18. The tangible, non-transitory computer-readable medium of claim 15, wherein the one or more home score factors are one or more first home score factors, and generating the home modification recommendation includes:
  determining one or more second home score factors based on at least the past hazard data;
  comparing the one or more second home score factors with the one or more first home score factors to determine a particular second home score factor is greater than a corresponding first home score factor; and
  generating the home modification recommendation such that the home modification recommendation corresponds to the particular second home score factor.

19. The tangible, non-transitory computer-readable medium of claim 15, wherein the home score is a first home score, and generating the home modification recommendation includes:
  determining, based upon at least the past hazard data, a home modification implemented for the second property that caused an improvement to a second home score corresponding to the second property; and
  generating the home modification recommendation such that the home modification recommendation includes the determined home modification.

20. The tangible, non-transitory computer-readable medium of claim 15, wherein the one or more home score factors include: (i) a fire hazard score, (ii) a safety score, (iii) a weather hazard score, (iv) a property feature hazard score, and (v) a potential hazards score.

* * * * *